US009614888B2

United States Patent
Kumakura et al.

(10) Patent No.: US 9,614,888 B2
(45) Date of Patent: Apr. 4, 2017

(54) PICTURE CODING DEVICE, PICTURE CODING METHOD, AND PICTURE CODING PROGRAM, AND PICTURE DECODING DEVICE, PICTURE DECODING METHOD, AND PICTURE DECODING PROGRAM

(71) Applicant: JVC KENWOOD Corporation, Yokohama-shi (JP)

(72) Inventors: Toru Kumakura, Yokosuka (JP); Shigeru Fukushima, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 69 days.

(21) Appl. No.: 14/495,485

(22) Filed: Sep. 24, 2014

(65) Prior Publication Data

US 2015/0010078 A1 Jan. 8, 2015

Related U.S. Application Data

(63) Continuation of application No. PCT/JP2013/003444, filed on May 31, 2013.

(30) Foreign Application Priority Data

May 31, 2012 (JP) .................. 2012-125358
May 31, 2012 (JP) .................. 2012-125359

(51) Int. Cl.
*H04N 19/593* (2014.01)
*H04N 19/176* (2014.01)
(Continued)

(52) U.S. Cl.
CPC .......... *H04L 65/607* (2013.01); *H04N 19/13* (2014.11); *H04N 19/14* (2014.11); *H04N 19/176* (2014.11);
(Continued)

(58) Field of Classification Search
CPC ...... H04N 19/13; H04N 19/176; H04N 19/18; H04N 19/593; H04N 19/70; H04N 19/91;
(Continued)

(56) References Cited

U.S. PATENT DOCUMENTS 6,480,537 B1 * 11/2002 Agrawal .............. H04N 21/235
    375/240
7,813,567 B2 * 10/2010 Sankaran ............ H03M 7/4006
    341/107

(Continued)

FOREIGN PATENT DOCUMENTS

JP    2007-300517 A    11/2007

OTHER PUBLICATIONS

International Search Report in PCT International Application No. PCT/JP2013/003444, dated Aug. 6, 2013.

(Continued)

*Primary Examiner* — Nathnael Aynalem
(74) *Attorney, Agent, or Firm* — Venable LLP; Michael A. Sartori; Laura G. Remus

(57) ABSTRACT

A picture coding device partitions differential information between a coding target picture and a prediction target picture into sub blocks and codes the partitioned sub blocks. The device codes significant sub block information that represents whether or not all the values of differential coefficients belonging to the sub block are zero and codes significant differential coefficient information that represents whether or not the value of the differential coefficient is zero. A context index processing unit derives a context used for coding the significant sub block information and a context used for coding the significant differential coefficient information of the differential coefficient that is a coding target based on an addition equation using the significant sub block information of a coded sub block that is horizontally neigh- (Continued)

boring to the coding target sub block and the significant sub block information of a coded sub block that is vertically neighboring.

3 Claims, 22 Drawing Sheets

(51) Int. Cl.
*H04L 29/06* (2006.01)
*H04N 19/13* (2014.01)
*H04N 19/463* (2014.01)
*H04N 19/14* (2014.01)
*H04N 19/18* (2014.01)
*H04N 19/436* (2014.01)

(52) U.S. Cl.
CPC ........... *H04N 19/18* (2014.11); *H04N 19/463* (2014.11); *H04N 19/436* (2014.11)

(58) Field of Classification Search
CPC .... H04N 19/109; H04N 19/11; H04N 19/159; H04N 19/50; H04N 19/52; H04N 19/17; H04N 19/174; H03M 7/4018
USPC .......................... 375/240.01–240.29
See application file for complete search history.

(56) References Cited

U.S. PATENT DOCUMENTS

| | | | | |
|---|---|---|---|---|
| 2005/0123207 A1* | 6/2005 | Marpe | ................ | H04N 19/196 382/239 |
| 2008/0219578 A1* | 9/2008 | Lee | ................ | H04N 19/13 382/247 |
| 2009/0279797 A1* | 11/2009 | Choi | ................ | H04N 19/91 382/233 |
| 2009/0296806 A1* | 12/2009 | Hsu | ................ | H03M 7/4006 375/240.01 |
| 2012/0082232 A1* | 4/2012 | Sole Rojals | ......... | H04N 19/176 375/240.18 |
| 2012/0082233 A1* | 4/2012 | Sze | ................ | H04N 19/13 375/240.18 |
| 2012/0207400 A1* | 8/2012 | Sasai | ................ | H04N 19/13 382/233 |
| 2012/0230417 A1* | 9/2012 | Sole Rojals | ..... | H04N 19/00109 375/240.18 |
| 2013/0003824 A1* | 1/2013 | Guo | ................ | H04N 19/176 375/240.03 |
| 2013/0188735 A1* | 7/2013 | Nguyen | ............... | H04N 19/176 375/240.25 |
| 2013/0195200 A1* | 8/2013 | Nguyen | ................ | H04N 19/13 375/240.25 |

OTHER PUBLICATIONS

International Preliminary Report on Patentability and Written Opinion in PCT International Application No. PCT/JP2013/003444, dated Dec. 2, 2014.

Notification of Reasons for Refusal in Japanese Patent Application No. 2012-125358, dated Jul. 15, 2014.

J. Min et al., "Non-CE11: Simplified multi-level significance map coding," Joint Collaborative Team on Video Coding (JCT-VC) of ITU-T SG16 WP3 and ISO/IEC JTC1/SC29/WG11, 8th Meeting: San José, USA, Feb. 1-10, 2012, pp. 1-8, Document: JCTVC-H0131.

T. Kumakura, "Non-CE3: Simplified context derivation for significance map," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, pp. 1-9, Document JCTVC-10296.

Decision of Refusal issued in Japanese Patent Application No. 2012-125358 dated Dec. 9, 2014.

* cited by examiner

PRIOR ART

PRIOR ART

FIG.10

```
        posX                           posX
    0   1   2   3  ⌐601            0   1   2   3  ⌐602
  ┌───┬───┬───┬───┐              ┌───┬───┬───┬───┐
0 │ 1 │ 1 │ 1 │ 0 │            0 │ 2 │ 2 │ 1 │ 1 │
  ├───┼───┼───┼───┤              ├───┼───┼───┼───┤
1 │ 1 │ 1 │ 0 │ 0 │            1 │ 2 │ 1 │ 1 │ 1 │
  ├───┼───┼───┼───┤              ├───┼───┼───┼───┤
2 │ 1 │ 0 │ 0 │ 0 │            2 │ 1 │ 1 │ 1 │ 0 │
  ├───┼───┼───┼───┤              ├───┼───┼───┼───┤
3 │ 0 │ 0 │ 0 │ 0 │            3 │ 1 │ 1 │ 0 │ 0 │
  └───┴───┴───┴───┘              └───┴───┴───┴───┘
```

PICTURE CODING DEVICE, PICTURE CODING METHOD, AND PICTURE CODING PROGRAM, AND PICTURE DECODING DEVICE, PICTURE DECODING METHOD, AND PICTURE DECODING PROGRAM

BACKGROUND

1. Field of the Invention

The present invention relates to a picture coding and decoding technology, and more particularly, to a technology for entropy coding and decoding of a residual signal.

2. Description of the Related Art

In MPEG-4 AVC that is an international standard of moving picture coding, as an entropy coding system, context switching-type arithmetic coding called CABAC is employed. CABAC includes a plurality of variables called a context that stores the occurrence probability of information to be coded. An optimal context is selected from among neighboring coding information and is used for coding. In addition, since the occurrence probability is updated according to a coding process also in each context, the occurrence probability of coding information can be estimated with high accuracy, whereby efficient coding can be performed.

Patent Literature 1: JP 2007-300517 A

In the MPEG-4 AVC, in addition to the estimation of the occurrence probability of information according to switching a context based on the neighboring decoded information, the occurrence probability according to a decoding result is learned. The occurrence probability of information to be decoded can be optimized for each context, and accordingly, the improvement of the coding efficiency is realized. However, for all the significant differential coefficient information within the block to be processed, it is necessary to sequentially process the calculation of context indexes and decoding of the significant differential coefficient information, and a calculation time is required.

In Patent Literature 1, a technique for decreasing a processing delay relating to decoding is disclosed by arranging a context for a syntax element having a high occurrence frequency on a memory having a small access delay time. However, the technique disclosed in Patent Literature 1, does not resolve the dependency between the calculation of the context index and the decoding of a syntax element, and these processes cannot be performed in a parallel manner and is not an essential solution for a processing delay.

SUMMARY OF THE INVENTION

The present invention is contrived in consideration of such a situation, and an object thereof is to provide a picture coding/decoding technology, in the differential coefficient coding/decoding, realizing a context index calculation method having a small calculation amount by enabling a parallel process, having a simple configuration, and being appropriate for real-time processing. In addition, another object thereof is to provide a picture coding and decoding technology having high coding efficiency by realizing the calculation of a context index referring to neighboring differential coefficient that is appropriate in terms of correlation.

In order to solve the problems, a picture coding device according to one aspect of the present invention is one that partitions differential information between a picture that is a coding target and a picture that is a prediction target into a plurality of sub blocks and codes the partitioned sub blocks in a predetermined sequence, and the picture coding device includes: a significant sub block information encoder (708, 701) that codes significant sub block information that represents whether or not all the values of differential coefficients belonging to the sub block are zero; a significant differential coefficient information encoder (706, 701) that codes significant differential coefficient information that represents whether or not the value of the differential coefficient is zero; a differential coefficient value encoder (707, 701) that codes the value of the differential coefficient; and a context deriver (711) that derives a context used for coding the significant sub block information of the sub block that is a coding target and a context used for coding the significant differential coefficient information of the differential coefficient belonging to the sub block that is the coding target based on an addition equation using the significant sub block information of a coded sub block that is neighboring to the sub block that is the coding target in the horizontal direction and the significant sub block information of a coded sub block that is neighboring to the sub block that is the coding target in the vertical direction.

According to another aspect of the present invention, there is provided a picture coding method. This method is a method in which differential information between a picture that is a coding target and a picture that is a prediction target is partitioned into a plurality of sub blocks and the partitioned sub blocks are coded in a predetermined sequence, and the method includes: coding significant sub block information that represents whether or not all the values of differential coefficients belonging to the sub block are zero; coding significant differential coefficient information that represents whether or not the value of the differential coefficient is zero; coding the value of the differential coefficient; and deriving a context used for coding the significant sub block information of the sub block that is a coding target and a context used for coding the significant differential coefficient information of the differential coefficient belonging to the sub block that is the coding target based on an addition equation using the significant sub block information of a coded sub block that is neighboring to the sub block that is the coding target in the horizontal direction and the significant sub block information of a coded sub block that is neighboring to the sub block that is the coding target in the vertical direction.

According to further another aspect of the present invention, there is provided a transmission device. This device includes: a packet processing unit that derives coding data by packetizing a bitstream that is coded by using a picture coding method in which differential information between a picture that is a coding target and a picture that is a prediction target is partitioned into a plurality of sub blocks, and the partitioned sub blocks are coded in a predetermined sequence; and a transmitter that transmits the packetized coding data. The picture coding method includes: coding significant sub block information that represents whether or not all the values of differential coefficients belonging to the sub block are zero; coding significant differential coefficient information that represents whether or not the value of the differential coefficient is zero; coding the value of the differential coefficient; and deriving a context used for coding the significant sub block information of the sub block that is a coding target and a context used for coding the significant differential coefficient information of the differential coefficient belonging to the sub block that is the coding target based on an addition equation using the significant sub block information of a coded sub block that is neighboring to the sub block that is the coding target in the horizontal direction and the significant sub block information of a coded sub block that is neighboring to the sub block that is the coding target in the vertical direction.

According to further another aspect of the present invention, there is provided a transmission method. This method includes: deriving coding data by packetizing a bitstream that is coded by using a picture coding method in which differential information between a picture that is a coding target and a picture that is a prediction target is partitioned into a plurality of sub blocks, and the partitioned sub blocks are coded in a predetermined sequence; and transmitting the packetized coding data. The picture coding method includes: coding significant sub block information that represents whether or not all the values of differential coefficients belonging to the sub block are zero; coding significant differential coefficient information that represents whether or not the value of the differential coefficient is zero; coding the value of the differential coefficient; and deriving a context used for coding the significant sub block information of the sub block that is a coding target and a context used for coding the significant differential coefficient information of the differential coefficient belonging to the sub block that is the coding target based on an addition equation using the significant sub block information of a coded sub block that is neighboring to the sub block that is the coding target in the horizontal direction and the significant sub block information of a coded sub block that is neighboring to the sub block that is the coding target in the vertical direction.

According to an aspect of the present invention, there is provided a picture decoding device that decodes a bitstream in which differential information between a picture that is a decoding target and a picture that is a prediction target is partitioned into a plurality of sub blocks, and the partitioned sub blocks are coded in a predetermined sequence. The picture decoding device includes: a significant sub block information decoder (1008, 1001) that decodes significant sub block information that represents whether or not all the values of differential coefficients belonging to the sub block are zero; a significant differential coefficient information decoder (1006, 1001) that decodes significant differential coefficient information that represents whether or not the value of the differential coefficient is zero; a differential coefficient value decoder (1007, 1001) that decodes the value of the differential coefficient; and a context deriver (1010) that derives a context used for decoding the significant sub block information of the sub block that is a decoding target and a context used for decoding the significant differential coefficient information of the differential coefficient belonging to the sub block that is the decoding target based on an addition equation using the significant sub block information of a decoded sub block that is neighboring to the sub block that is the decoding target in the horizontal direction and the significant sub block information of a decoded sub block that is neighboring to the sub block that is the decoding target in the vertical direction.

According to another aspect of the present invention, there is provided a picture decoding method. This method is a picture decoding method decoding a bitstream in which differential information between a picture that is a decoding target and a picture that is a prediction target is partitioned into a plurality of sub blocks, and the partitioned sub blocks are coded in a predetermined sequence and includes: decoding significant sub block information that represents whether or not all the values of differential coefficients belonging to the sub block are zero; decoding significant differential coefficient information that represents whether or not the value of the differential coefficient is zero; decoding the value of the differential coefficient; and deriving a context used for decoding the significant sub block information of the sub block that is a decoding target and a context used for decoding the significant differential coefficient information of the differential coefficient belonging to the sub block that is the decoding target based on an addition equation using the significant sub block information of a decoded sub block that is neighboring to the sub block that is the decoding target in the horizontal direction and the significant sub block information of a decoded sub block that is neighboring to the sub block that is the decoding target in the vertical direction.

According to further another aspect of the present invention, there is provided a reception device. This device is a reception device that receives a bitstream in which a moving picture is coded and decodes the received bitstream and includes: a reception unit that receives coding data obtained by packetizing a bitstream in which differential information between a picture that is a decoding target and a picture that is a prediction target is partitioned into a plurality of sub blocks, and the partitioned sub blocks are coded in a predetermined sequence; a restoration unit that restores the bitstream by performing packet processing of the received packetized coding data; a significant sub block information decoder (1008, 1001) that decodes significant sub block information that represents whether or not all the values of differential coefficients belonging to the sub block are zero from the restored bitstream; a significant differential coefficient information decoder (1006, 1001) that decodes significant differential coefficient information that represents whether or not the value of the differential coefficient is zero from the restored bitstream; a differential coefficient value decoder (1007, 1001) that decodes the value of the differential coefficient from the restored bitstream; and a context deriver (1010) that derives a context used for decoding the significant sub block information of the sub block that is a decoding target and a context used for decoding the significant differential coefficient information of the differential coefficient belonging to the sub block that is the decoding target based on an addition equation using the significant sub block information of a decoded sub block that is neighboring to the sub block that is the decoding target in the horizontal direction and the significant sub block information of a decoded sub block that is neighboring to the sub block that is the decoding target in the vertical direction.

According to further another aspect of the present invention, there is provided a reception method. This method is a reception method receiving a bitstream in which a moving picture is coded and decoding the received bitstream and includes: receiving coding data obtained by packetizing a bitstream in which differential information between a picture that is a decoding target and a picture that is a prediction target is partitioned into a plurality of sub blocks, and the partitioned sub blocks are coded in a predetermined sequence; restoring the bitstream by performing packet processing of the received packetized coding data; decoding significant sub block information that represents whether or not all the values of differential coefficients belonging to the sub block are zero from the restored bitstream; decoding significant differential coefficient information that represents whether or not the value of the differential coefficient is zero from the restored bitstream; decoding the value of the differential coefficient from the restored bitstream; and deriving a context used for decoding the significant sub block information of the sub block that is a decoding target and a context used for decoding the significant differential coefficient information of the differential coefficient belonging to the sub block that is the decoding target based on an addition equation using the significant sub block information of a decoded sub block that is neighboring to the sub block that is the decoding target in the horizontal direction and the significant sub block information of a decoded sub block that is neighboring to the sub block that is the decoding target in the vertical direction.

Furthermore, an arbitrary combination of the constituent elements described above or a conversion of the representation of the present invention among a method, a device, a system, a recording medium, a computer program, and the like is also valid as an aspect of the present invention.

BRIEF DESCRIPTION OF THE DRAWINGS

FIG. 10 is a diagram that illustrates the definition of a context in the decoding sequence of significant differential coefficients according to the second example;

DETAILED DESCRIPTION

The invention will now be described by reference to the preferred embodiments. This does not intend to limit the scope of the present invention, but to exemplify the invention.

First, technologies that are the premise of embodiments of the present invention will be described.

A technique of associating a plurality of contexts with each coding syntax and selecting a context based on the correlation among syntax elements can optimize code allocation, and thereby enabling efficient coding.

Figure 11:
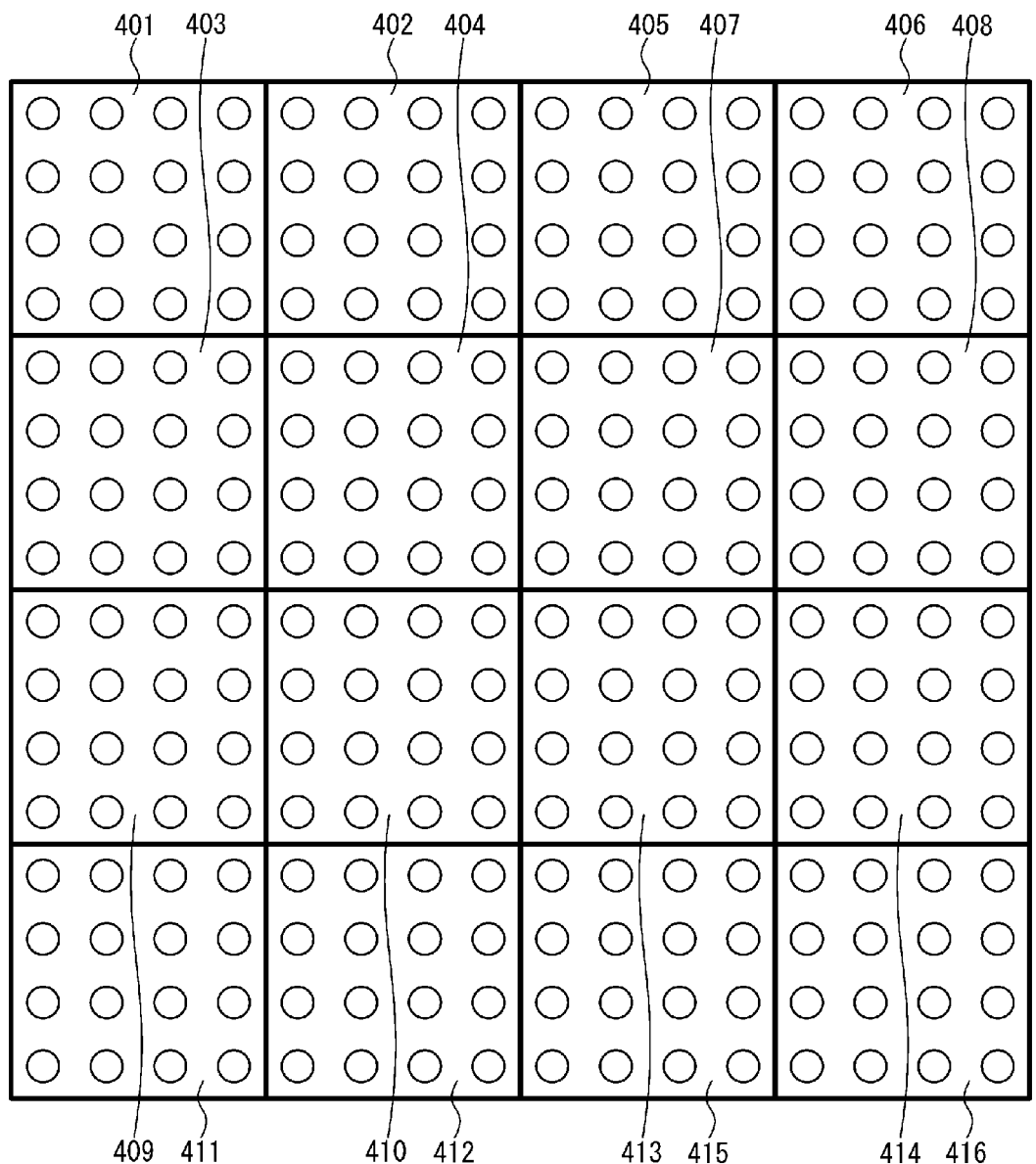
FIG. 11 is a diagram that illustrates a sub block partition of the differential coefficients.

As an example of context switching entropy coding, the decoding sequence of a quantization orthogonal transform coefficient of a differential signal that is coded into the size of 16×16 will be described with reference to a flowchart illustrated in FIG. 1. FIG. 11 illustrates a quantization orthogonal transform coefficient to be processed. Hereinafter, the quantization orthogonal transform coefficient will be referred to as a differential coefficient. In this sequence, a differential coefficient of 16×16 to be processed is partitioned into sub blocks 401 to 416 each having the size of 4×4, and scanning in units of sub blocks is performed first.

Figure 7:
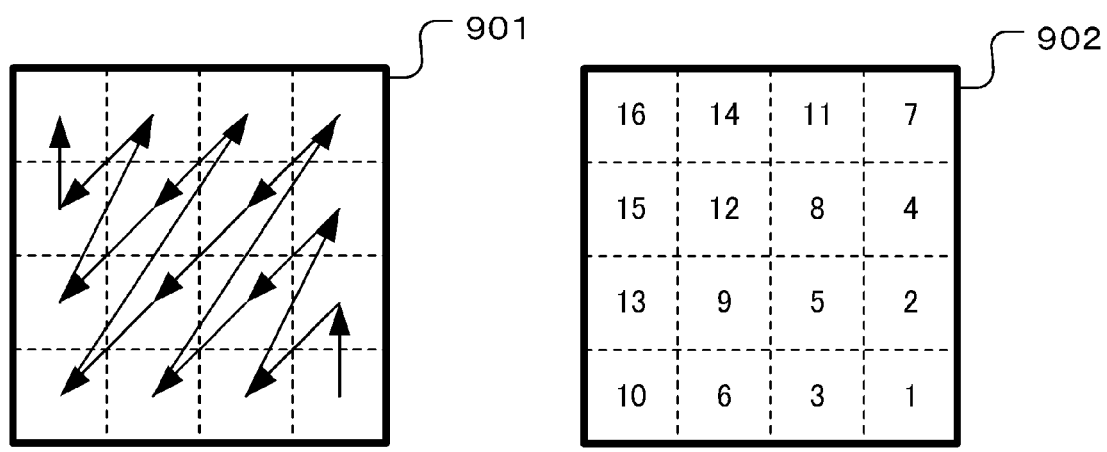
FIG. 7 is a diagram that illustrates the scanning sequence of sub block differential coefficients.

A sub block to be processed is determined in accordance with the scanning sequence to be described later (S101). When the scanning of all the sub blocks is completed, the decoding process of the differential coefficient ends. The scanning sequence of sub blocks is denoted by reference numeral 902 illustrated in FIG. 7. When the scanning of all the sub blocks is completed, the decoding process of the differential coefficient ends. The scanning sequence of sub blocks is denoted by reference numeral 902 illustrated in FIG. 7. In this sequence, scanning is started from a sub block disposed on the lower rightmost side of the differential coefficient region, scanning according to a rule of the lower right side to the upper left side and the upper right side to the upper left side is performed, and the scanning is completed at a sub block disposed on the upper leftmost side. Reference numeral 901 illustrated in FIG. 7 illustrates the scanning sequence of sub blocks using arrows. In a case where the scanning sequence illustrated in FIG. 7 is applied, in all the sub blocks to be processed, the scanning of sub blocks spatially positioned respectively on the right side and the lower side is in the completed state.

Figure 1:
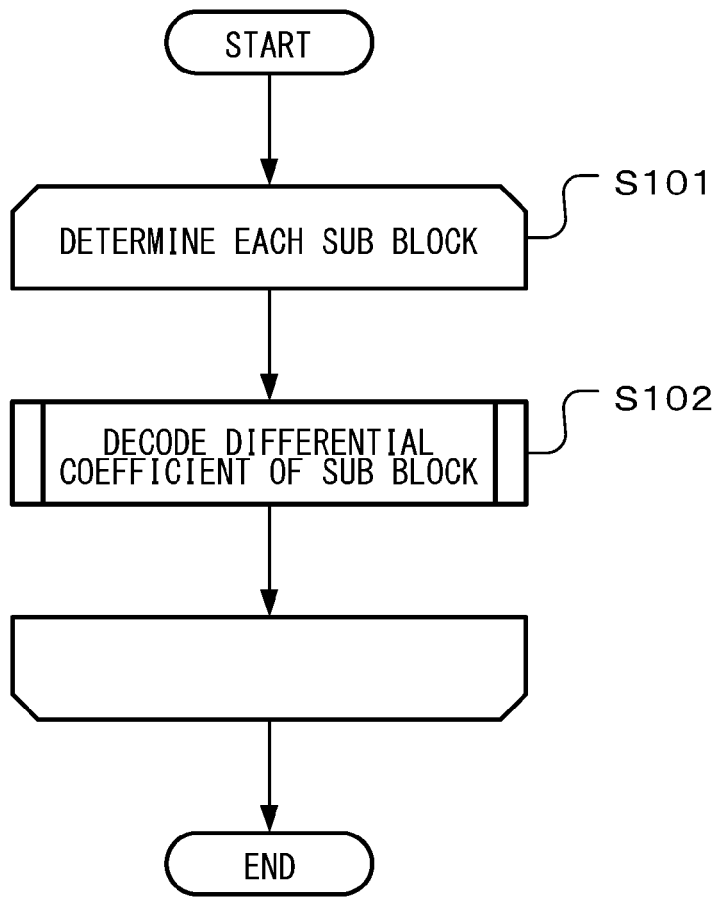
FIG. 1 is a flowchart that illustrates a conventional decoding sequence of differential coefficients.

Referring back to the flowchart illustrated in FIG. 1, the decoding process of all the differential coefficient values of the sub block to be processed is performed (S102). After the decoding of the sub block differential coefficient values is completed, the process proceeds to step S101.

Figure 2:
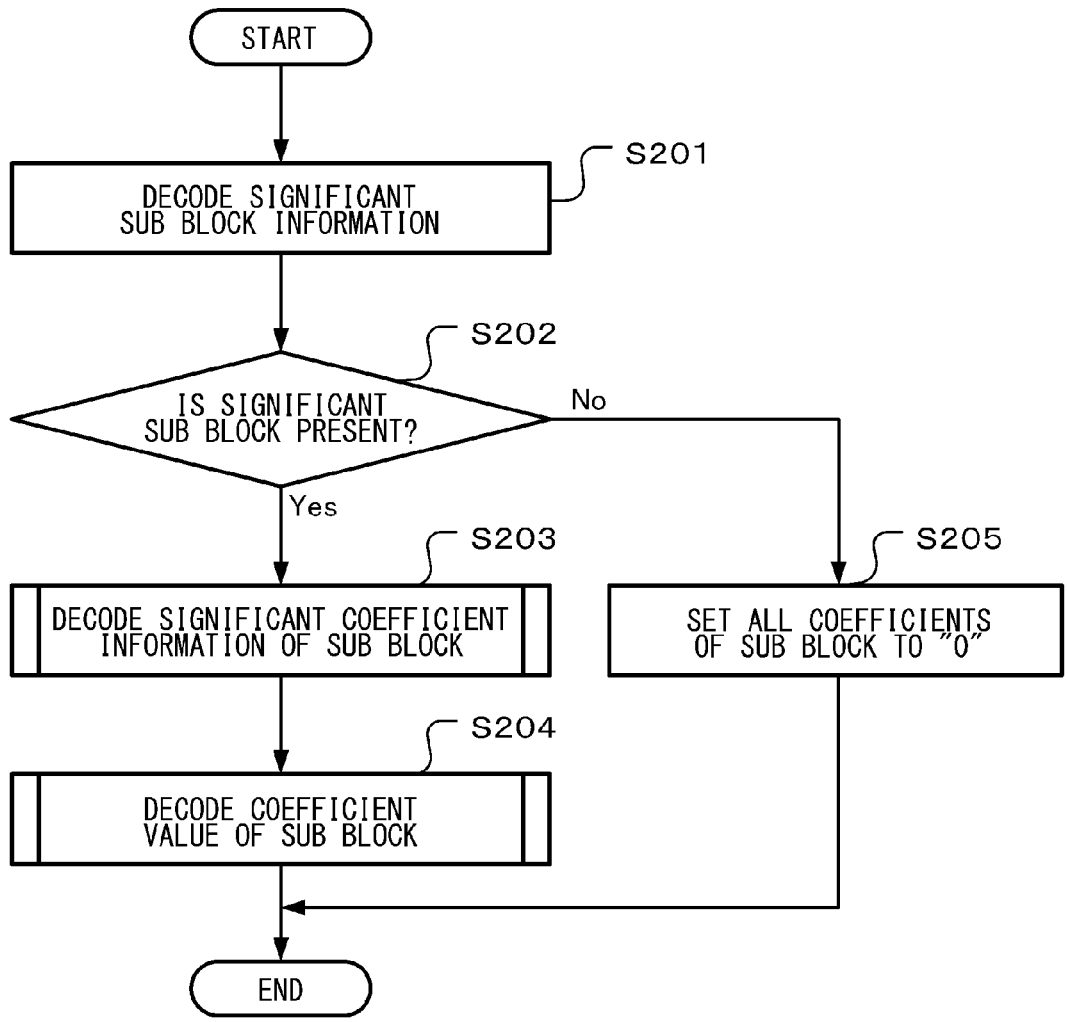
FIG. 2 is a flowchart that illustrates a conventional decoding sequence of sub block differential coefficients.

The decoding process of the sub block differential coefficient values will be described in detail with reference to a flowchart illustrated FIG. 2.

Significant sub block information is decoded (S201). The significant sub block information is a one-bit flag used for representing the presence of a differential coefficient having a value other than "0" in a sub block to be processed. In a case where the significant sub block information is "1", it represents that at least one differential coefficient having a value other than "0" is present in a sub block to be processed. On the other hand, in a case where the significant sub block information is "0", it represents that all the differential coefficients of a sub block to be processed are "0"s.

Subsequently, the value of the significant sub block information is determined (S202). When the significant sub block information has a value of "0", all the differential coefficient values of the sub block to be processed are set to "0" (S209), and the sub block differential coefficient value decoding process ends.

On the other hand, when the significant sub block information is "1", the decoding process of all the significant differential coefficient information of the sub block to be processed is performed (S203). The significant differential coefficient information is a one-bit flag used for representing that a differential coefficient value of a processing target position is not "0". In a case where the significant coefficient information is "1", it represents that the differential coefficient value of the processing target position is not "0". On the other hand, in a case where the significant coefficient information is "0", it represents that the differential coefficient value of the processing target position is "0". The decoding sequence of the significant differential coefficient information of a sub block will be described later in detail. After the decoding of all the significant differential coefficient information of the sub block is completed, the process proceeds to the decoding of differential coefficient values that is performed in step S204.

Subsequently, the decoding process of differential coefficient values is performed (S204). The decoding process of differential coefficient values will be described later in detail. After the completion of the decoding process of differential coefficient values, the process proceeds to step S101, and the scanning of the next sub block is performed.

[Sequence of Decoding Process of Significant Differential Coefficient]

The sequence of decoding of the significant differential coefficient information of the sub block that is performed in step S203 will be described with reference to a flowchart illustrated in FIG. 3.

A sub block to be processed is determined in accordance with a predetermined scanning sequence (S301). The scanning sequence of differential coefficients within the sub block, similarly to the scanning sequence of the sub block in the differential coefficient region, is assumed to follow the rule illustrated in FIG. 7.

Figure 9:
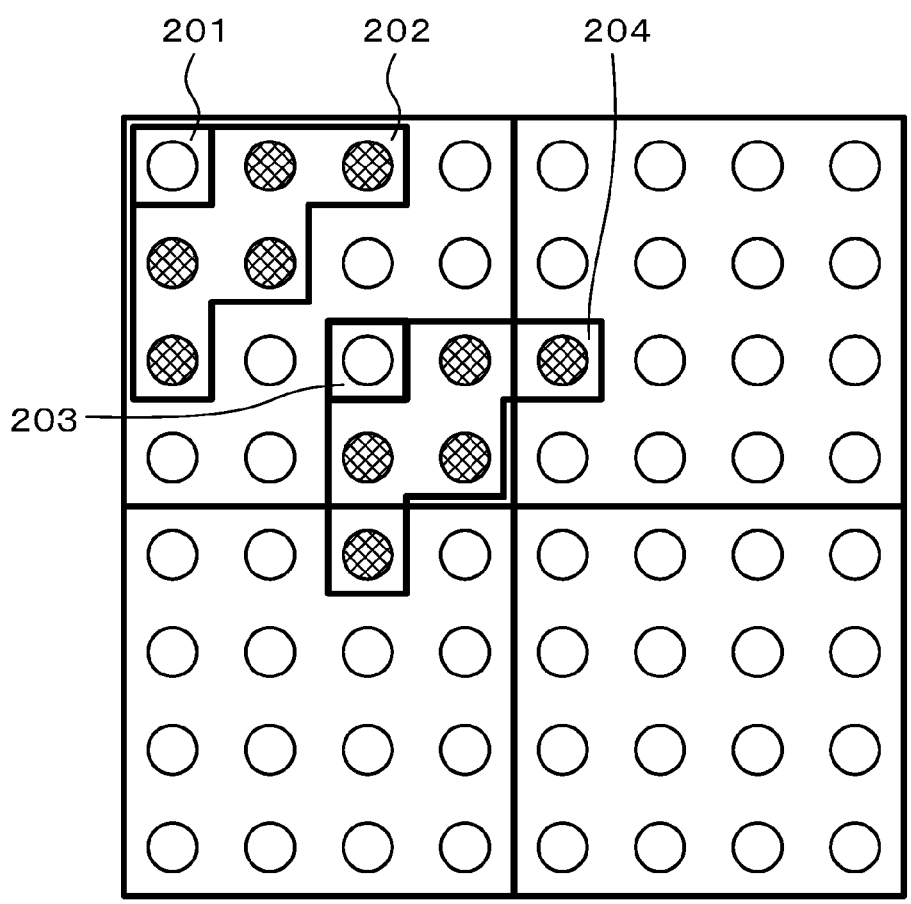
FIG. 9 is a diagram that illustrates the definition of a neighboring differential coefficient in the decoding sequence of significant differential coefficients illustrated in FIG. 3.

A neighboring significant differential coefficient sum countCoeff that is the sum of the numbers of decoded differential coefficients, which are neighboring to the processing target differential coefficient position, having values other than "0" is calculated (S302). FIG. 9 illustrates an example of the differential coefficient position used for calculating the neighboring significant differential coefficient sum countCoeff. Reference numeral 202 denotes neighboring differential coefficients of a case where the processing target position is as denoted by reference numeral 201, and reference numeral 204 denotes neighboring differential coefficients of a case where the processing target position is as denoted by reference numeral 203. As illustrated in FIG. 9, five differential coefficients that are located respectively on the right side and the lower side of the processing target differential coefficient position and are neighboring to the processing target differential coefficient position are set as neighboring differential coefficients. Since the scanning sequence of differential coefficients follows the sequence illustrated in FIG. 7, the decoding of differential coefficients that belong to the same sub block as that of the processing target differential coefficient and are located respectively on the right side and the lower side of the processing target differential coefficient position is completed. Similarly, the decoding of the significant differential coefficients belonging to sub blocks located respectively on the right side and the lower side of the sub block to which the processing target position belongs is completed. The neighboring differential coefficient sum countCoeff is a variable used for estimating the occurrence probability of the significant differential coefficient. In accordance with the characteristics of a picture and the visual characteristics, as the significant differential coefficient, "1" may be easily concentrated in the low region, and "0" may be easily concentrated in the high region. Since the significant differential coefficients have a spatial correlation, differential coefficients neighboring to the processing target position are set as targets for the calculation of the neighboring differential coefficient sum countCoeff. The neighboring differential coefficients representing the outside of the differential coefficient region are excluded from the calculation of the neighboring significant coefficient sum countCoeff.

Figure 3:
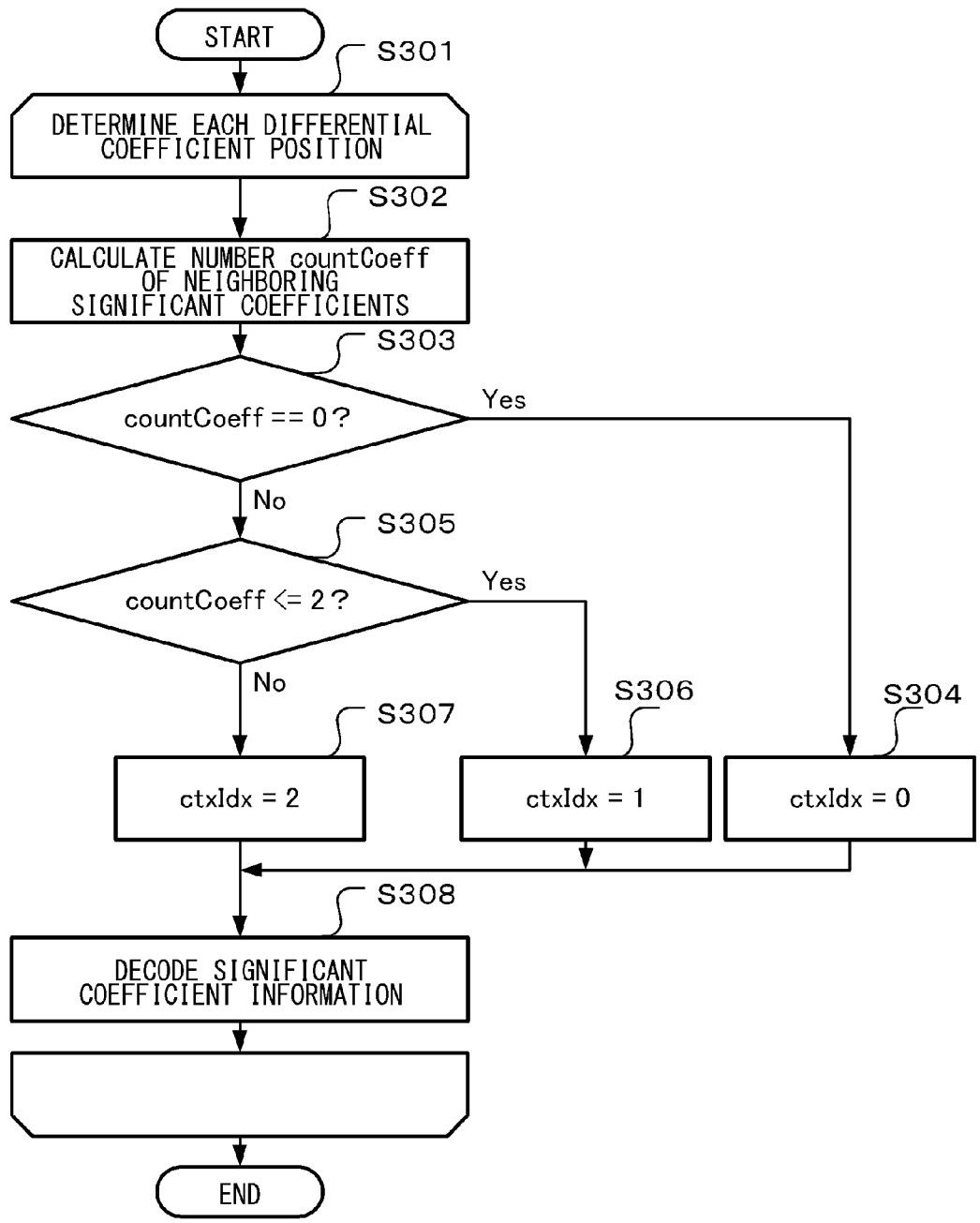
FIG. 3 is a flowchart that illustrates a conventional decoding sequence of significant differential coefficients.

Referring back to the flowchart illustrated in FIG. 3, it is determined whether the neighboring significant coefficient sum countCoeff is "0" (S303). In a case where the neighboring significant coefficient sum countCoeff is "0", a context index ctxIdx used for decoding the significant differential coefficient information is set to "0" (S304), and the significant differential coefficient information is decoded by using a context that corresponds to the context index ctxIdx. Then, the significant differential coefficient information is set to the differential coefficient value (S308).

In a case where the neighboring significant coefficient sum countCoeff is not "0", it is determined whether the neighboring significant coefficient sum countCoeff is smaller than or equal to "2" (S305). In a case where the neighboring significant coefficient sum countCoeff is smaller than or equal to "2", the context index ctxIdx used for decoding the significant differential coefficient information is set to "1" (S306), and the significant differential coefficient information is decoded by using a context that corresponds to the context index ctxIdx. Then, the significant differential coefficient information is set to the differential coefficient value (S308).

In a case where the neighboring significant coefficient sum countCoeff is not smaller than or equal to "2", in other words, in a case where the neighboring significant coefficient sum countCoeff is larger than or equal to "3", the context index ctxIdx used for decoding the significant differential coefficient information is set to "2" (S307), and the significant differential coefficient information is decoded by using a context that corresponds to the context index ctxIdx. Then, the significant differential coefficient information is set to the differential coefficient value (S308).

A context is a variable used for storing the occurrence probability of information to be decoded, and the assignment of a code word changes based on the occurrence probability represented by the context. In the example described above, three contexts coding the significant differential coefficient are defined, and the context decoding the significant differential coefficient is determined based on the magnitude of the neighboring significant differential coefficient sum. It is set in advance such that, for a context corresponding to the context index ctxIdx=0 at a time when the neighboring significant coefficient sum countCoeff is "0", the occurrence probability of the significant coefficient information that is "0" is high, and, for a context corresponding to the context index ctxIdx=2 at a time when the neighboring significant coefficient sum countCoeff is larger than or equal to "3", the occurrence probability of the significant coefficient information that is "1" is high. For information of which the occurrence probability is high, the coding amount can be decreased, and accordingly, by increasing the estimation accuracy of the occurrence probability, the coding efficiency can be improved.

In MPEG-4 AVC, by performing switching between contexts based on neighboring decoded information, in addition to the estimation of the occurrence probability of information, the occurrence probability according to a decoding result is learned. Thus, the occurrence probability of information to be decoded for each context can be optimized, whereby the improvement of the coding efficiency is realized.

Generally, in orthogonally transformed components of a picture, information may be easily concentrated in the low region. In addition, since there is a low influence of the degradation of a high region component on visual characteristics, frequently, the high region component is roughly quantized for a practical use. Accordingly, the significant coefficient information tends to be concentrated in the low region component. The significant coefficient information has a high correlation with the neighboring significant coefficient, and it is reasonable to perform switching among contexts based on the number of pieces of the neighboring significant coefficient information from the viewpoint of the coding efficiency.

[Differential Coefficient Value Decoding Process]

Figure 12:
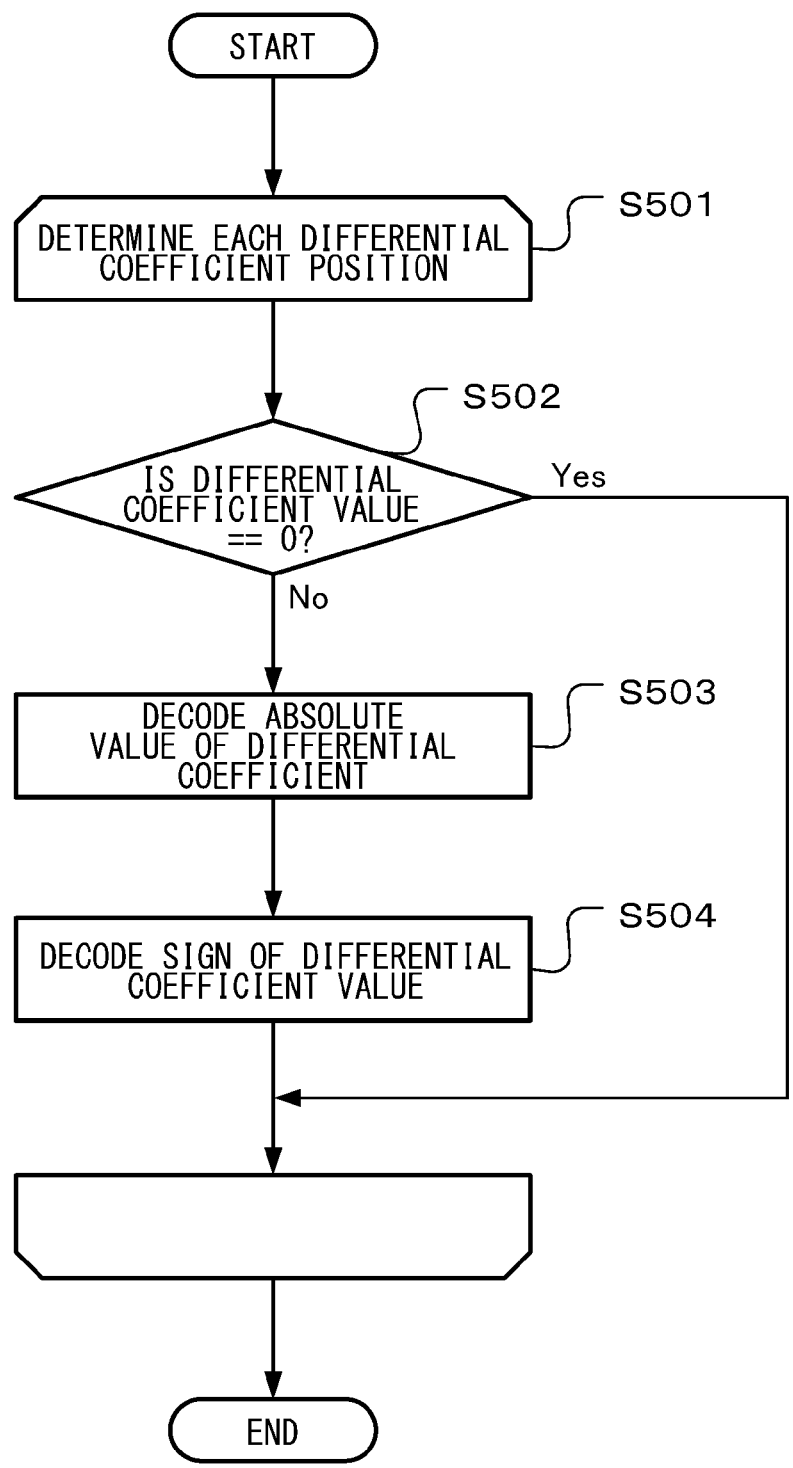
FIG. 12 is a flowchart that illustrates the decoding sequence of differential coefficient values according to the first example.

The decoding sequence of differential coefficient values of the sub block in step S204 of the flowchart illustrated in FIG. 2 will be described with reference to a flowchart illustrated in FIG. 12.

A sub block to be processed is determined in accordance with a predetermined scanning sequence (S501). The scanning sequence of differential coefficients disposed within a sub block, similarly to the scanning sequence of the significant differential coefficient information, is assumed to follow the rule illustrated in FIG. 7. When the scanning of all the differential coefficients of the sub block is completed, the decoding process of differential coefficient values is completed, and the process proceeds to the sequence (S101) of determining the next sub block.

Subsequently, it is determined whether or not the differential coefficient value of the processing target differential coefficient position is "0" (S502). In a case where the differential coefficient value of the processing target differential coefficient position is "0", the decoding of the differential coefficient value of the processing target differential coefficient position is completed, and the process proceeds to step S501.

In a case where the differential coefficient value of the processing target differential coefficient position is "1", the absolute value of the differential coefficient of the processing target differential coefficient position is decoded (S503). In a case where this sequence is performed, it is determined that the differential coefficient value is not "0", and, as a bitstream, a code word corresponding to a value derived by decreasing one from the absolute value of the differential coefficient is coded. Accordingly, as the absolute value of the differential coefficient, a value derived by adding "1" to a value that is derived by performing entropy decoding of a code word is set.

Subsequently, the sign of the differential coefficient of the processing target differential coefficient position is decoded (S504). A differential coefficient value is determined based on the absolute value of the differential coefficient and the sign of the differential coefficient.

In the decoding sequence of the significant differential coefficient information described above, a differential coefficient 201 illustrated in FIG. 9, as is represented in the scanning sequence denoted by reference numeral 902 illustrated in FIG. 7, is scanned last in the sub block, and the scanning sequence thereof is 16 as is denoted by reference numeral 902 illustrated in FIG. 7. In addition, among the neighboring differential coefficients 202 of the differential coefficient 201, the scanning sequence of a position neighboring to the lower side of the differential coefficient 201 is 15 and is scanned immediately before the differential coefficient 201. Since the context index ctxIdx that is necessary for decoding the significant differential coefficient information of the differential coefficient 201 is calculated based on the significant differential coefficient sum of the differential coefficients 202, the context index ctxIdx of the differential coefficient 201 cannot be determined until the decoding of the significant differential coefficient information of the differential coefficient 202 is completed. This means that it is necessary to process the calculation of the context index ctxIdx and the decoding of the significant differential coefficient information in order for all the significant differential coefficient information within the sub block, and a decrease in the time or the calculation amount through parallel processing cannot be obtained. Meanwhile, the occupancy rate of the differential coefficient in the bitstream is high, and the context index calculating process and the decoding process of the significant differential coefficient information have a long time and a large calculation amount occupied in the entire decoding process. In other words, the decoding process of the significant coefficient information is the most significant bottleneck in the real-time decoding process.

In Patent Literature 1, a technique for decreasing a processing delay relating to a decoding process by arranging a context for a syntax element having a high occurrence frequency in a memory having a short access delay time has been disclosed. However, the technique disclosed in Patent Literature 1 does not solve the dependency between the calculation of a context index and the decoding of a syntax element and cannot perform the processes thereof in a parallel manner, whereby it cannot be an essential solution for the processing delay.

Thus, an embodiment of the present invention provides a picture coding technology that, in the coding/decoding of differential coefficients, eliminates the dependency between the calculation of context indexes and the coding/decoding of the significant differential coefficient information, realizes a context index calculating method that can perform processes in a parallel manner and has a small amount of calculation, and has a simple circuit configuration so as to be appropriate for real-time processing. In addition, by realizing the calculation of context indexes performed with reference to neighboring differential coefficients, which is appropriate in terms of the correlation, a picture coding technology having high coding efficiency is provided. Hereinafter, embodiments of the present invention will be described.

In description presented below, a "block to be processed" is a coding target block in the case of a coding process performed by a picture coding device and is a decoding target block in the case of a decoding process performed by a picture decoding device. In addition, a "processed block" is a decoded block of which coding has been completed in the case of a coding process performed by the picture coding device and is a block of which decoding has been completed in the case of a decoding process performed by the picture decoding device. Hereinafter, such a meaning will be used unless otherwise noted.

[Coding Device]

Figure 5:
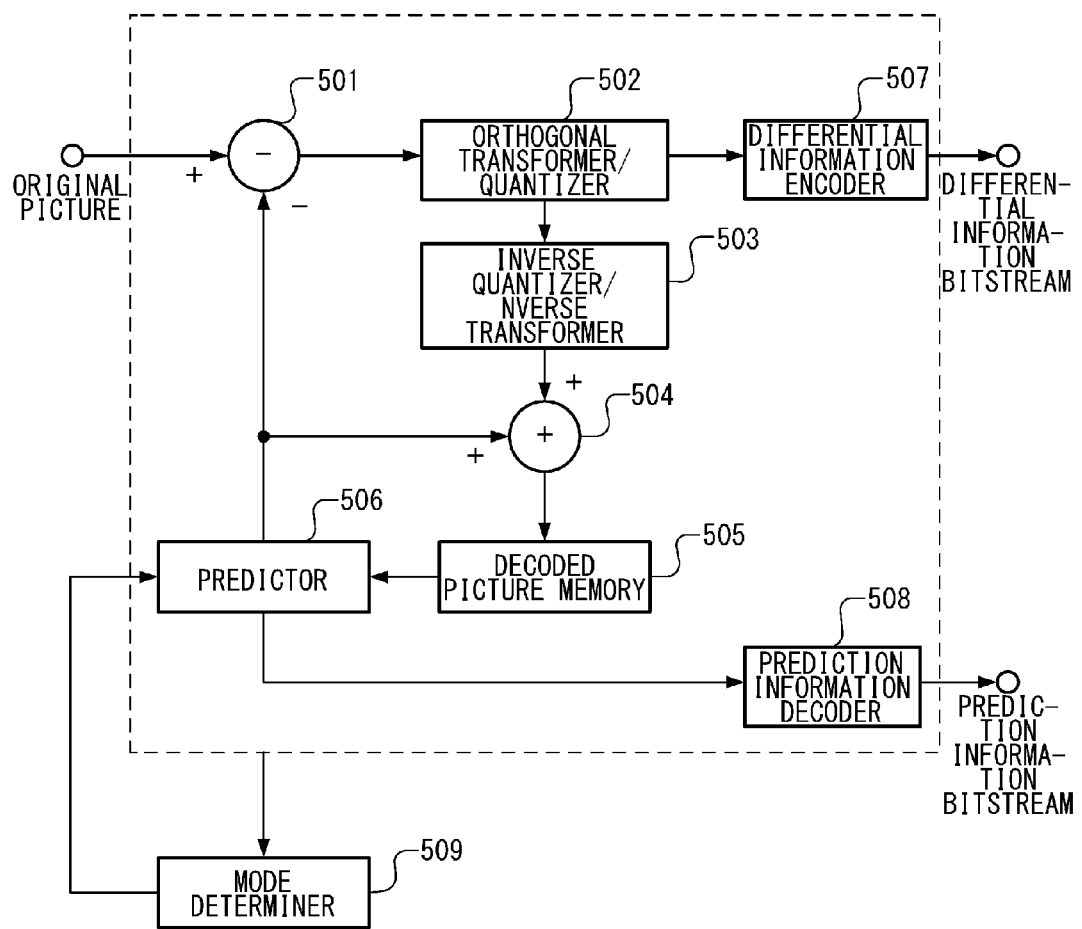
FIG. 5 is a block diagram that illustrates the configuration of a picture coding device, which is used for executing a method for coding differential coefficients, according to an embodiment.

A preferred picture coding device according to the present invention will be described with reference to the drawings. FIG. 5 is a block diagram that illustrates the configuration of the picture coding device according to an embodiment. The picture coding device according to the embodiment includes: a subtractor 501; an orthogonal transformer/quantizer 502; an inverse quantizer/inverse transformer 503; an adder 504; a decoded picture memory 505; a predictor 506; a differential information encoder 507; a prediction information encoder 508; and a mode determiner 509.

The mode determiner 509 tentatively codes all the prediction candidates and determines prediction information that is optimal to each block of the picture. As the prediction information, a partitioned block size and a prediction mode representing an inter prediction or an intra prediction. In addition, in a case where the prediction mode is the inter prediction, motion information such as a motion vector and a reference picture index is included in the prediction information. On the other hand, in a case where the prediction mode is the intra prediction, an intra prediction mode is included in the prediction information. The mode determiner 509 gives the determined prediction information to the predictor 506 and the prediction information encoder 508.

The prediction information encoder 508 performs variable length coding of the input prediction information and outputs a bitstream of the prediction information.

The predictor 506 generates a predicted picture using the input prediction information and the decoded picture stored in the decoded picture memory 505 and gives the generated predicted picture to the subtractor 501.

The subtractor 501 generates a differential picture by subtracting the predicted picture from the original picture that is a coding target and gives the generated differential signal to the orthogonal transformer/quantizer 502.

The orthogonal transformer/quantizer 502 generates differential coefficients by performing an orthogonal transform and quantization of the differential picture and gives the generated differential coefficients to the inverse quantizer/inverse transformer 503 and the differential information encoder 507.

The differential information encoder 507 performs entropy coding of the differential coefficients and outputs a bitstream of the differential information.

The inverse quantizer/inverse transformer 503 generates a decoded differential signal by performing the inverse quantization and the inverse orthogonal transform of the differential coefficients received from the orthogonal transformer/quantizer 502 and gives the generated decoded differential signal to the adder 504.

The adder 504 generates a decoded picture by adding the predicted picture and the decoded differential signal and stores the generated decoded picture in the decoded picture memory 505.

[Decoding Device]

Figure 6:
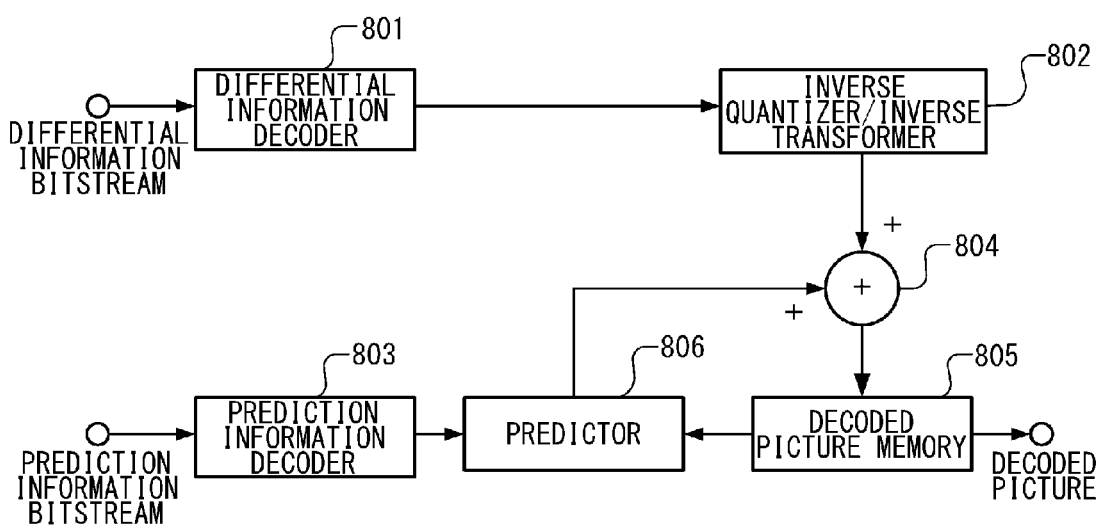
FIG. 6 is a block diagram that illustrates the configuration of a picture decoding device, which is used for executing a method for decoding differential coefficients, according to an embodiment.

A preferred picture decoding device according to the present invention will be described with reference to the drawings. FIG. 6 is a block diagram that illustrates the configuration of the picture decoding device according to an embodiment. The picture decoding device according to the embodiment includes: a differential information decoder 801; an inverse quantizer/inverse transformer 802; a prediction information decoder 803; an adder 804; a decoded picture memory 805; and a predictor 806.

The decoding process of the picture decoding device illustrated in FIG. 6 corresponds to the decoding process arranged inside the picture coding device illustrated in FIG. 5. Accordingly, the configurations of the inverse quantizer/inverse transformer 802, the adder 804, the decoded picture memory 805, and the predictor 806 illustrated in FIG. 8 have functions respectively corresponding to the configurations of the inverse quantizer/inverse transformer 503, the adder 504, the decoded picture memory 505, and the predictor 506 of the picture coding device illustrated in FIG. 5.

The prediction information decoder 803 generates prediction information by performing entropy decoding of an input prediction information bitstream and gives the generated prediction information to the predictor 806.

The predictor 806 generates a predicted picture by using the input prediction information and the decoded picture that is stored in the decoded picture memory 805 and gives the generated predicted picture to the adder 804.

The differential information decoder 801 generates differential information by performing entropy decoding of the differential information. Then, the differential information decoder 801 gives the generated differential information to the inverse quantizer/inverse transformer 802.

The inverse quantizer/inverse transformer 802 generates a decoded differential signal by performing the inverse quantization and the inverse orthogonal transform of the differential information received from the differential information decoder 801 and gives the generated decoded differential signal to the adder 804.

The adder 804 generates a decoded picture by adding the predicted picture and the decoded differential signal together, stores the generated decoded picture in the decoded picture memory 805, and outputs the generated decoded picture.

Figure 8:
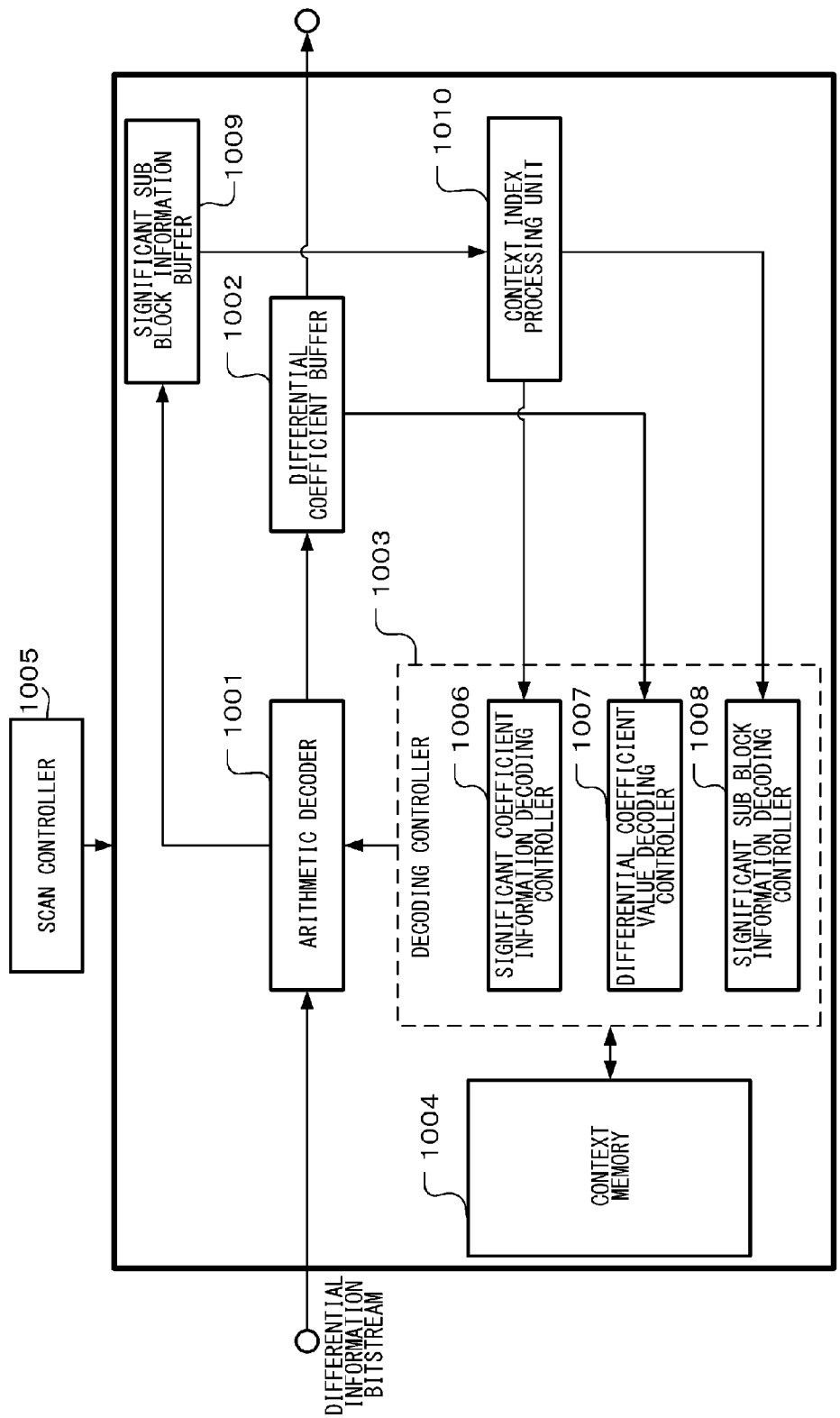
FIG. 8 is a block diagram that illustrates the detailed configuration of the picture decoding device, which is illustrated in FIG. 6, according to a first example.

The coding process and the decoding process of differential coefficients according to an embodiment of the present invention are respectively performed by the differential information encoder 507 of the motion picture coding device illustrated in FIG. 5 and the differential information decoder 801 of the motion picture decoding device illustrated in FIG. 8. Hereinafter, the coding process and the decoding process of the differential information according to an embodiment will be described in detail.

[Coding Block]

Figure 13:
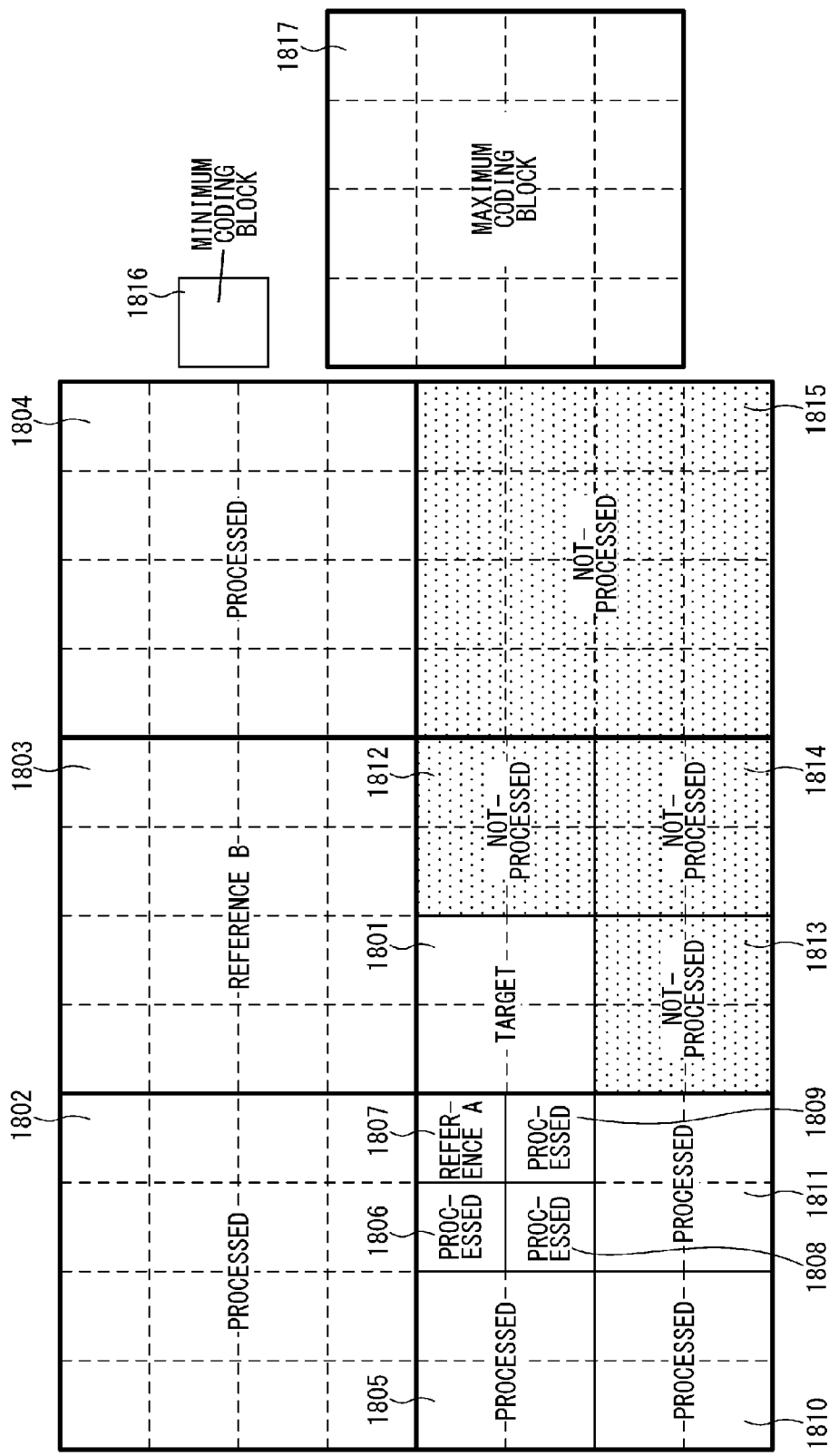
FIG. 13 is a diagram that illustrates the size of a coding block.

According to the embodiment, as illustrated in FIG. 13, the screen is hierarchically partitioned into rectangular blocks, and the blocks are processed in order according to a predetermined processing sequence. Each block that is partitioned will be referred to as a coding block. A block 1817 illustrated in FIG. 13 is a maximum unit of the partition according to the embodiment and will be referred to as a maximum coding block. In addition, a block 1816 illustrated in FIG. 13 is a minimum unit of the partition according to the embodiment and will be referred to as a minimum coding block. Hereinafter, the minimum coding block will be described as a block of 4×4 pixels and the maximum coding block will be described as a block of 16×16 pixels.

[Prediction Block]

Among the coding blocks, a unit in which the intra prediction is performed will be referred to as a prediction block. The prediction block has several sizes as below that are larger than or equal to that of the minimum coding block and are smaller than or equal to that of the maximum coding block. In FIG. 13, blocks 1802, 1803, and 1804 are 16×16 blocks, blocks 1805, 1810, 1811, and 1801 are 8×8 blocks, and blocks 1806, 1807, 1808, and 1809 are 4×4 blocks. Blocks 1812, 1813, 1814, and 1815 are blocks that have not been processed, and the coding block sizes thereof are not determined. In the coding sequence, an optimal prediction block size is determined, and blocks of the prediction block size are coded. In the decoding sequence, the prediction block size is derived from the bitstream. Hereinafter, the description will be presented with the prediction block being assumed as the processing unit.

[Processing Unit of Differential Coefficient]

While the unit in which the quantization and the orthogonal transform are performed is the same as the unit of the prediction block, in the coding process and the decoding process, the scanning is performed with the differential coefficient region being partitioned into a plurality of sub blocks. The size of the sub block is a size of 4×4. FIG. 11 illustrates a differential coefficient region of a size of 16×16. Here, reference numerals 401 to 416 represent sub blocks. However, the unit in which the quantization and the orthogonal transform are performed may be determined independently from the unit of the prediction block.

First Example

Coding Sequence

Figure 14:
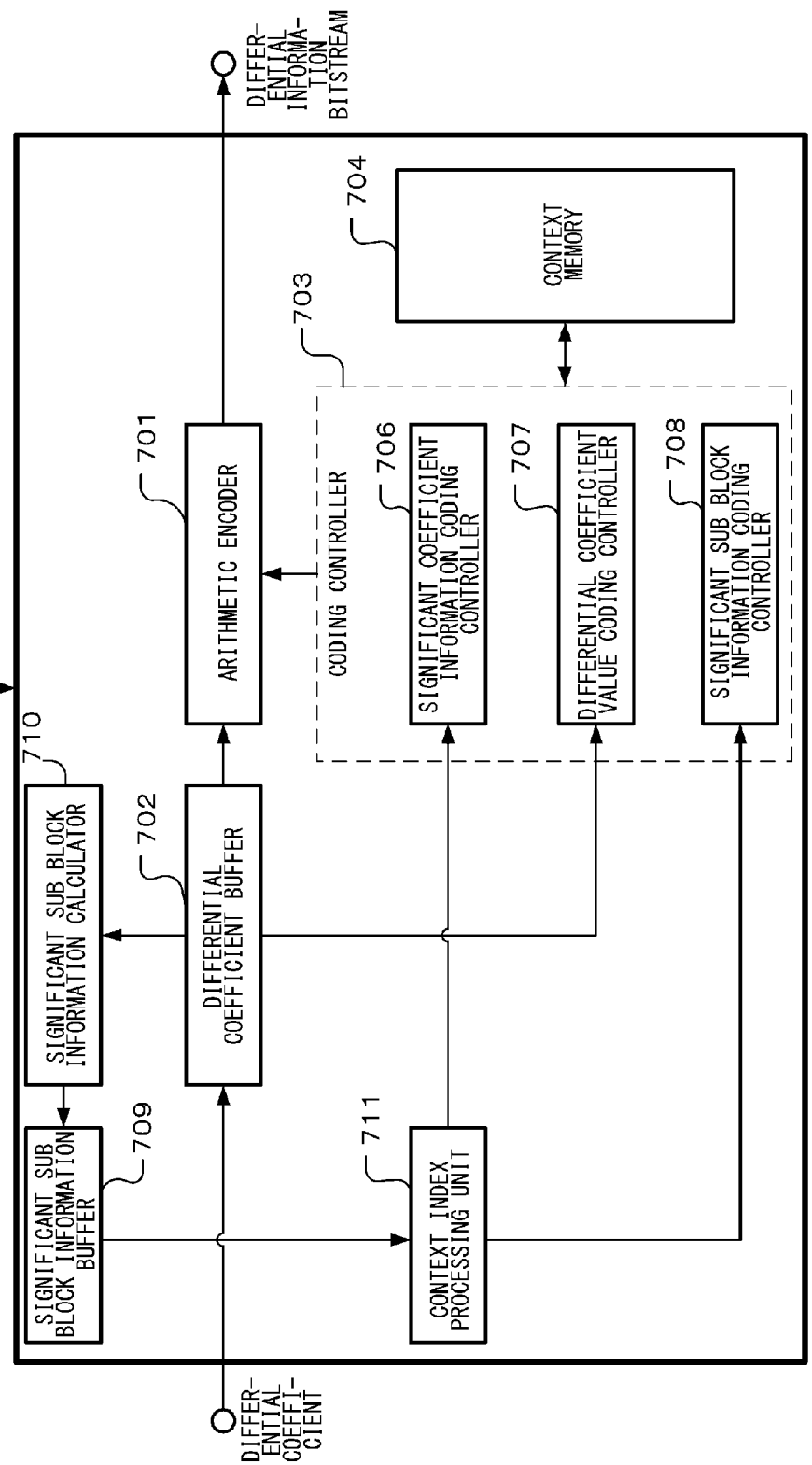
FIG. 14 is a block diagram that illustrates the detailed configuration of the picture coding device, which is illustrated in FIG. 5, according to the first example.
Figure 15:
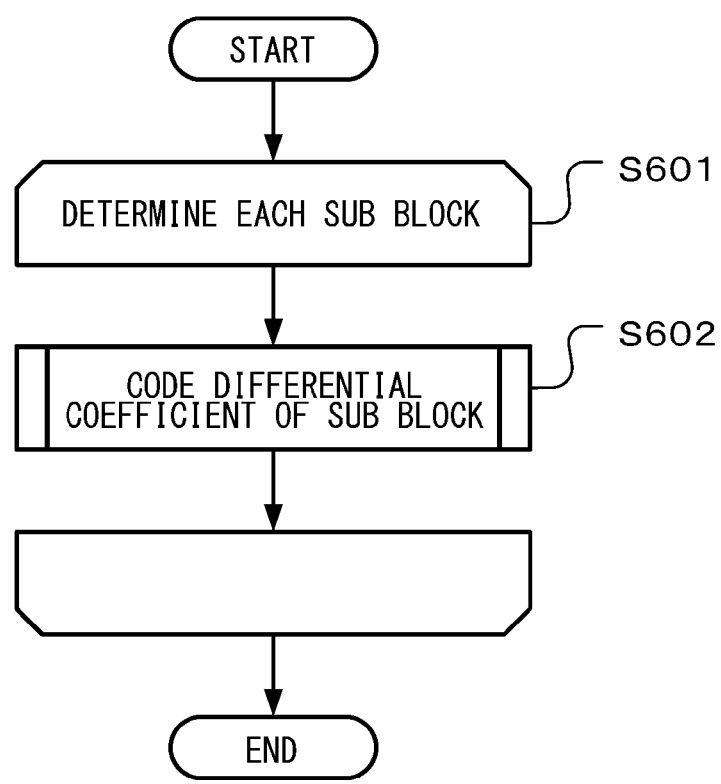
FIG. 15 is a flowchart that illustrates the coding sequence of differential coefficients according to the first example.
Figure 16:
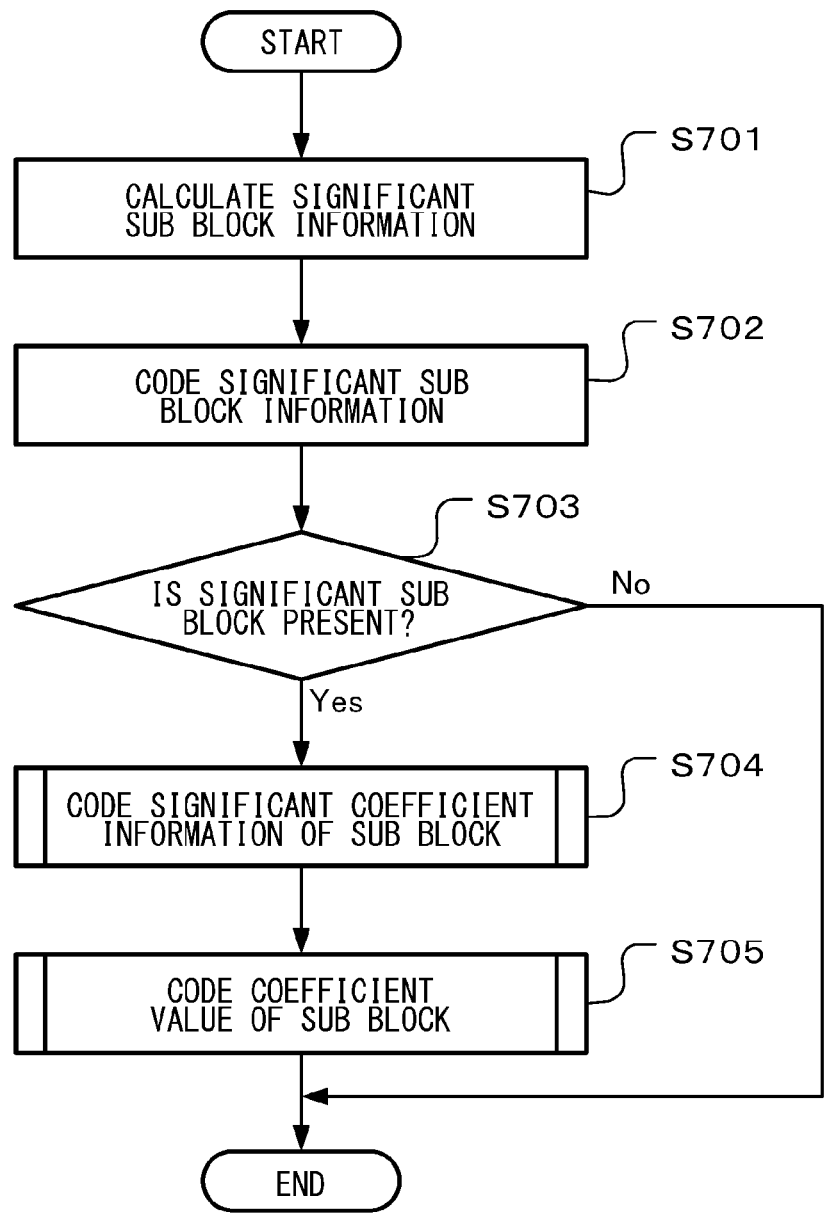
FIG. 16 is a flowchart that illustrates the coding sequence of sub block differential coefficients according to the first example.

A first example of the method of coding the differential information according to an embodiment of the present invention will now be described. FIG. 14 is a block diagram that illustrates the detailed configuration of the differential information encoder 507, which is illustrated in FIG. 5, according to the first example. The differential information encoder 507 according to the first example includes: an arithmetic encoder 701; a differential coefficient buffer 702; a coding controller 703; a context memory 704; and a scan controller 705. In addition, the coding controller 703 includes: a significant coefficient information coding controller 706; a differential coefficient value coding controller 707; a significant sub block information coding controller 708; a significant sub block information buffer 709; a significant sub block information calculator 710; and a context index processing unit 711.

Hereinafter, the coding sequence of differential coefficients will be described with reference to flowcharts illustrated in FIGS. 15, 16, 18, and 21.

The scan controller 705 determines a sub block to be processed (S601). When the scanning of all the sub blocks is completed, the decoding process of differential coefficients ends. Reference numeral 902 represented in FIG. 7 illustrates the scanning sequence of sub blocks. In this sequence, scanning is started from a sub block disposed on the lower rightmost side of the differential coefficient region, scanning according to a rule of the lower right side to the upper left side and the upper right side to the upper left side is performed, and the scanning is completed at a sub block disposed on the upper leftmost side. As described above, the context is updated in accordance with the coding process. By taking this scanning sequence, a low region component in which a differential coefficient can easily occur is scanned after a high region component, and accordingly, there is an advantage in the process that the estimated accuracy of the occurrence probability of a differential coefficient of the low region component is improved. Reference numeral 901 illustrated in FIG. 7 is a diagram that illustrates the scanning sequence of sub blocks using arrows. In a case where the scanning sequence illustrated in FIG. 7 is applied, the scanning of sub blocks spatially positioned respectively on the right side and the lower side of the sub block to be processed is in the completed state. The coding process of the sub block to be processed is performed (S602).

[Coding Sequence of Sub Block (S602)]

The significant sub block information calculator 710 derives a sub block to be processed from the differential coefficient buffer 702. All the differential coefficients of the sub block are scanned, and, in a case where all the differential coefficient values are "0", the significant sub block information is set to "0". Otherwise (in a case where there is at least one differential coefficient value other than "0"), the significant sub block information is set to "1" (S701). The significant sub block information buffer 709 stores significant sub block information.

The context index processing unit 711 derives the significant sub block information of sub blocks that are neighboring to the sub block to be processed and are decoded from the significant sub block information buffer 709 and determines a context index ctxIdx used for coding the significant sub block information. In this sequence, reference significant sub block information is set as significant sub block information sigGroupRight of a sub block neighboring to the right side of a sub block to be processed and significant sub block information sigGroupBottom of a sub block neighboring to the lower side of the sub block to be processed, and the context index ctxIdx is determined based on a logical sum of the significant sub block information sigGroupRight and sigGroupBottom. The reason for determining the context index ctxIdx in the sequence described as above is as follows. Generally, significant coefficients are concentrated in a low region of the orthogonal transform area. Since the significant sub block information has a spatial correlation, the significant sub block information of a sub block to be processed can be estimated based on the decoded sub block information of the sub block to be processed. The significant sub block information coding controller 708 reads a context that corresponds to the context index ctxIdx from the context memory 704. Then, the significant sub block information and the context are transmitted to the arithmetic encoder 701. The arithmetic encoder 701 codes the significant sub block information using the context (S702).

The significant sub block information coding controller 708 determines the value of the significant sub block information (S703). When the significant sub block information is "0", the sub block differential coefficient value coding process ends, and the process proceeds to step S601.

When the significant sub block information is "1", the coding process of all the significant differential coefficient information of the sub block to be processed is performed (S704). The coding sequence of the significant differential coefficient information will be described later in detail. After the coding of all the significant differential coefficient information of the sub block ends, the process proceeds to the coding of differential coefficient values of step S704.

The differential coefficient value coding controller 707 performs the coding process of all the differential coefficient values of the sub block to be processed (S705). The coding sequence of differential coefficient values of the sub block will be described later in detail. After the coding of all the differential coefficient values of the sub block is completed, the process proceeds to step S601.

[Sequence of Coding Process of Significant Differential Coefficient Information (S704)]

The context index processing unit 711 calculates a neighboring significant index sigCoeffIndex based on the significant sub block information of decoded sub blocks that are respectively neighboring to the right side and the lower side of the sub block to be processed that is supplied from the significant sub block information buffer 709. The neighboring significant index sigCoeffIndex is set as sigCoeffIndex=sigGroupRight+sigGroupBottom (S1201).

The significant coefficient information coding controller 706 determines differential coefficients that are the processing targets (S1202). The scanning sequence of differential coefficients within the sub block, similarly to the scanning sequence of sub blocks in the differential coefficient region, follows the rule represented in FIG. 7. When the scanning of all the significant differential coefficients of the sub block is completed, the coding process of the significant differential coefficients is completed, and the process proceeds to the coding sequence (S704) of differential coefficient values.

The significant coefficient information coding controller 706 derives the neighboring significant index sigCoeffIndex from the context index processing unit 711 and evaluates the derived neighboring significant index sigCoeffIndex (S1203).

Figure 20:
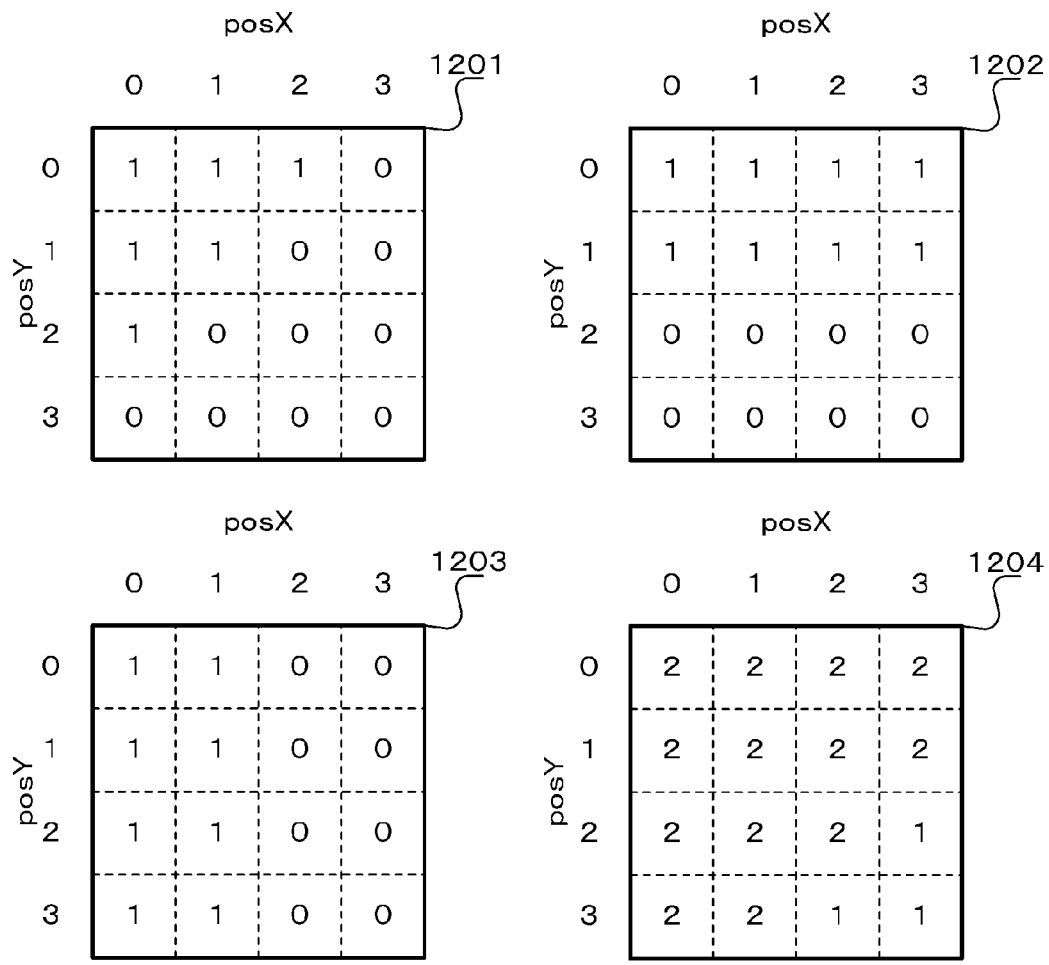
FIG. 20 is a diagram that illustrates the definition of a context in the decoding sequence of significant differential coefficients according to the first example.
Figure 21:
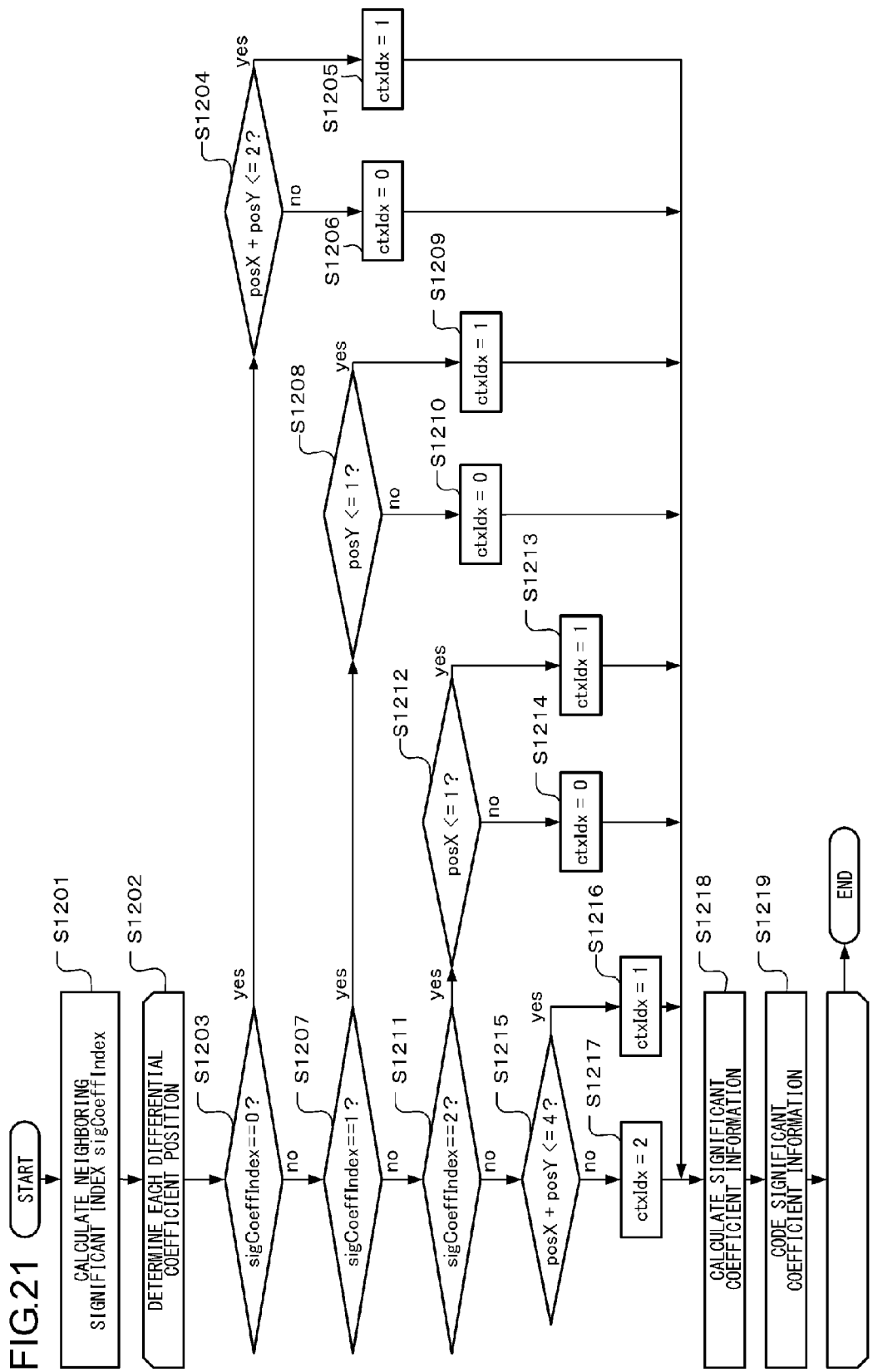
FIG. 21 is a flowchart that illustrates the coding sequence of significant differential coefficients according to the first example.
Figure 22:
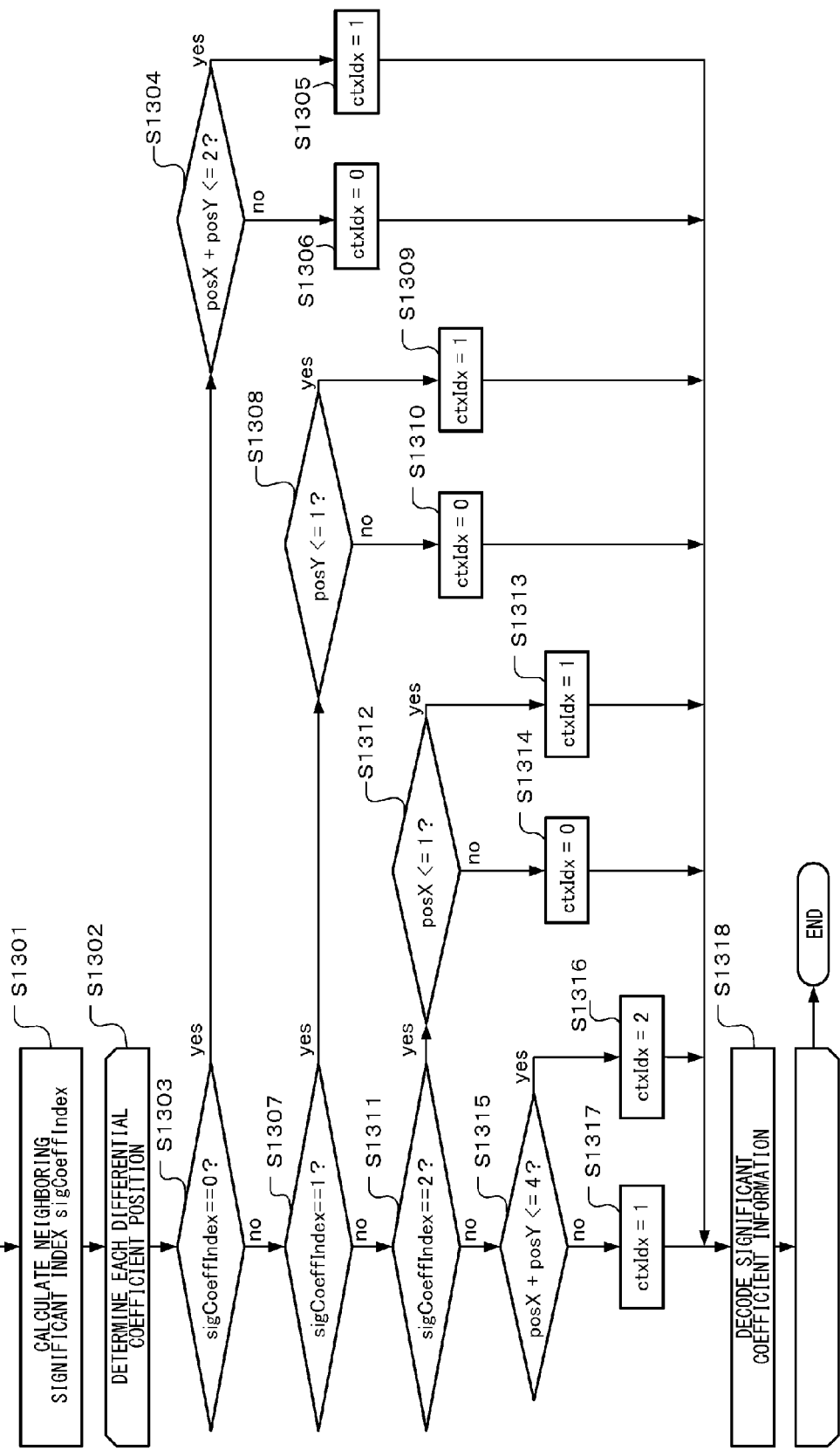
FIG. 22 is a flowchart that illustrates the decoding sequence of significant differential coefficients according to the first example.

In a case where the neighboring significant index sigCoeffIndex is "0", the position of the processing target differential coefficient within the sub block to be processed is determined (S1204). In a case where the neighboring significant index sigCoeffIndex is "0", it represents that the significant sub block information sigGroupRight is "0" and the significant sub block information sigGroupBottom is "0". Here, it is represented such that a horizontal differential coefficient position is posX, a vertical differential coefficient position is posY, and the processing target differential coefficient position is pos=posX+posY. In a case where pos<=2, the context index ctxIdx used for coding the significant coefficient information is set to "1" (S1205). Otherwise (pos>2), the context index ctxIdx is set to "0" (S1206). The definition of the context index ctxIdx of a case where the neighboring significant index sigCoeffIndex is "0" is denoted by reference numeral 1201 in FIG. 20.

On the other hand, in a case where the neighboring significant index sigCoeffIndex is not "0", it is determined whether the neighboring significant index sigCoeffIndex is "1" (S1207). In a case where the neighboring significant index sigCoeffIndex is "1", it represents that the significant sub block information sigGroupRight is "1" and the significant sub block information sigGroupBottom is "0". In a case where the neighboring significant index sigCoeffIndex is "1", the position of the processing target differential coefficient within the sub block to be processed is determined (S1208). In a case where the vertical differential coefficient position posY<=1, the context index ctxIdx used for decoding the significant coefficient information is set to "1" (S1209). Otherwise (posY>2), the context index ctxIdx is set to "0" (S1210). The definition of the context index ctxIdx of a case where the neighboring significant index sigCoeffIndex is "1" is denoted by reference numeral 1202 in FIG. 20.

On the other hand, in a case where the neighboring significant index sigCoeffIndex is not "1", it is determined whether the neighboring significant index sigCoeffIndex is "2" (S1211). In a case where the neighboring significant index sigCoeffIndex is "2", it represents that the significant sub block information sigGroupRight is "0" and the significant sub block information sigGroupBottom is "1". In a case where the neighboring significant index sigCoeffIndex is "2", the position of the processing target differential coefficient within the sub block to be processed is determined (S1212). In a case where the horizontal differential coefficient position posX<=1, the context index ctxIdx used for decoding the significant coefficient information is set to "1" (S1213). Otherwise (posX>2), the context index ctxIdx is set to "0" (S1214). The definition of the context index ctxIdx of a case where the neighboring significant index sigCoeffIndex is "2" is denoted by reference numeral 1203 in FIG. 20. In other words, the sequence of setting the context index ctxIdx of a case where the neighboring significant index sigCoeffIndex is "2" is a process in which the X-direction process and the Y direction process of a case where the neighboring significant index sigCoeffIndex is "1" are interchanged. For this reason, the process can be configured to be common, and the circuit scale of the hardware or the coding amount of the software can be reduced.

In addition, in a case where the neighboring significant index sigCoeffIndex is not "2", in other words, in a case where the neighboring significant index sigCoeffIndex is "3", the position of the processing target differential coefficient within the sub block to be processed is determined (S1215). In a case where the neighboring significant index sigCoeffIndex is "3", it represents that both the significant sub block information sigGroupRight and significant sub block information sigGroupBottom are "1". In a case where the processing target differential coefficient position pos<=4, the context index ctxIdx used for decoding the significant coefficient information is set to "2" (S1216). Otherwise (pos>5), the context index ctxIdx is set to "1" (S1217). The definition of the context index ctxIdx of a case where neighboring significant index sigCoeffIndex is "3" is denoted by reference numeral 1204 in FIG. 20.

The significant coefficient information coding controller 706 derives the differential coefficient of the processing target position from the differential coefficient buffer 702. In a case where the differential coefficient value is not "0", the significant differential coefficient information is set to "1". Otherwise (in a case where the differential coefficient value is "0"), the significant differential coefficient information is set to "0" (S1218).

After a context corresponding to the determined context index ctxIdx is read from the context memory 704, the significant coefficient information coding controller 706 transmits the significant differential coefficient information and the context to the arithmetic encoder 701. The arithmetic encoder 701 codes the significant differential coefficient information using the context (S1219).

[Differential Coefficient Value Coding Process (S705)]

The differential coefficient value coding controller 707 determines a differential coefficient that is the processing target (S901). The scanning sequence of differential coefficients disposed within a sub block, similarly to the scanning sequence of the significant differential coefficients, is assumed to follow the rule illustrated in FIG. 7. When the scanning of all the differential coefficients of the sub block is completed, the coding process of differential coefficient values is completed, and the process proceeds to the sequence (S601) of determining the next sub block.

The differential coefficient value coding controller 707 determines whether or not the differential coefficient value of the processing target differential coefficient position is "0" (S902). In a case where the differential coefficient value of the processing target differential coefficient position is "0", the coding of the differential coefficient value of the processing target differential coefficient position is completed, and the process proceeds to step S901.

In a case where the differential coefficient value of the processing target differential coefficient position is "not 0", the absolute value of the coded differential coefficient of the processing target differential coefficient position and the sign are calculated (S903 and S904). When this sequence is performed, the differential coefficient value is determined not to be "0". Accordingly, the absolute value of the coded differential coefficient is set as a value derived by decreasing one from the absolute value of the differential coefficient. In addition, in a case where the differential coefficient is positive, the sign is set to "0". On the other hand, in a case where the differential coefficient is negative, the sign is set to "1".

After the context is read from the context memory 704, the differential coefficient value coding controller 707 transmits a coding absolute value and the context to the arithmetic encoder 701. The arithmetic encoder 701 codes the coding absolute value using the context (S905).

After the context is read from the context memory 704, the differential coefficient value coding controller 707 transmits a sign and the context to the arithmetic encoder 701. The arithmetic encoder 701 codes the coding absolute value using the context (S905).

[Decoding Sequence]

A method of decoding differential coefficients according to a first example of the embodiment of the present invention will be described. FIG. 8 is a block diagram that illustrates the detailed configuration of the differential information decoder 801, which is illustrated in FIG. 6, according to the first example. The differential information decoder 801 according to the first example includes: an arithmetic decoder 1001; a differential coefficient buffer 1002; a decoding controller 1003; a context memory 1004; and a scan controller 1005. In addition, the decoding controller 1003 includes: a significant coefficient information decoding controller 1006; a differential coefficient value decoding controller 1007; a significant sub block information decoding controller 1008; a significant sub block information buffer 1009; and a context index processing unit 1010.

Since the differential information decoding process performed by the differential information decoder 801 illustrated in FIG. 8 corresponds to the differential information coding process performed by the differential information encoder 507 illustrated in FIG. 5, the configurations of the differential coefficient buffer 1002, the context memory 1004, the scan controller 1005, the significant sub block information buffer 1009, and the context index processing unit 1010 of the differential information encoder illustrated in FIG. 8 respectively have functions corresponding to the configurations of the differential coefficient buffer 702, the context memory 704, the scan controller 705, the significant sub block information buffer 709, and the context index processing unit 711 illustrated in FIG. 14.

Hereinafter, the decoding sequence of the differential information will be described with reference to the flowcharts illustrated in FIGS. 1, 2, 12, and 22.

The scan controller 1005 determines a sub block to be processed (S101). When the scanning of all the sub blocks is completed, the decoding process of differential coefficients ends. Reference numeral 902 represented in FIG. 7 illustrates the scanning sequence of sub blocks. In this sequence, scanning is started from a sub block disposed on the lower rightmost side of the differential coefficient region, scanning according to a rule of the lower right side to the upper left side and the upper right side to the upper left side is performed, and the scanning is completed at a sub block disposed on the upper leftmost side. Reference numeral 901 represented in FIG. 7 illustrates the scanning sequence of sub blocks using arrows. In a case where the scanning sequence illustrated in FIG. 7 is applied, the scanning of sub blocks spatially positioned respectively on the right side and the lower side of the sub block to be processed is in the completed state. The decoding process of the sub block to be processed is performed (S102).

[Sub Block Decoding (S102)]

The significant sub block information decoding controller 1008 derives the significant sub block information of decoded sub blocks that are neighboring to the sub block to be processed from the context index processing unit 1010, determines a context index ctxIdx used for decoding the significant sub block information, and reads a context used for decoding the significant sub block information based on the determined context index ctxIdx from the context memory 1004. The significant sub block information decoding controller 1008 transmits a decoding command together with the context to the arithmetic decoder 1001. The arithmetic decoder 1001 performs the decoding process of a bitstream by using the context, thereby decoding the significant sub block information (S201).

In this sequence, reference significant sub block information is set as significant sub block information sigGroupRight of a sub block neighboring to the right side of a sub block to be processed and significant sub block information sigGroupBottom of a sub block neighboring to the lower side of the sub block to be processed, and the context index ctxIdx is determined based on a logical sum of the significant sub block information sigGroupRight and sigGroupBottom.

In this sequence, for the calculation of the context index ctxIdx for the significant sub block information, the significant sub block information of the decoded neighboring sub blocks and the position of the processing target differential coefficient within the sub block are referred to. Hereinafter, the reason for employing such a configuration will be described.

Generally, the orthogonal transform coefficients of a picture may be easily concentrated in the low region component, and there is a high possibility that the significant coefficient information is "1". In addition, since it is difficult for the high region component of the orthogonal transform coefficient to receive a visual influence, the high region component is quantized in a rough manner in many cases, and accordingly, there is a high possibility that the coefficient value of the high region component is "0", and the significant coefficient information of the high region component is "0". Accordingly, compared to the significant sub block information of the high-region sub block, the significant sub block information of the low-region sub block has a high probability of being "1". In addition, the concentration of the significant differential coefficients in the low region means that the significant differential coefficients and the significant sub block information have a spatial correlation. By referring to the significant sub block information of the decoded sub blocks that are neighboring to the target sub block and are respectively disposed on the right side and the lower side for calculating the context index used for decoding the significant sub block information, the occurrence probability of the significant sub block information can be estimated with high accuracy.

In this example, from the viewpoint of a decrease in the processing amount and a decrease in the circuit scale, the context index of the significant sub block information of the sub block to be decoded is calculated based on a logical sum of the significant sub block information of the sub block neighboring to the right side of the sub block to be decoded and the significant sub block information of the sub block neighboring to the lower side, and the occurrence frequency of the significant sub block information of the sub block to be decoded is estimated based on whether or not the significant sub block information of at least one sub block of the right-side and lower-side sub blocks is "1". In addition, the significant sub block information can be estimated with higher accuracy and, for example, the higher accuracy can be realized by determining the context index based on a sum of the significant sub block information of the right-side and lower-side sub blocks. By employing such a configuration, in addition to the condition of whether or not the significant sub block information of at least one of the right-side and lower-side sub blocks is "1", based on a condition that both the significant sub block information of the right-side sub block and the significant sub block information of the lower-side sub block are "1", the context index is determined. Accordingly, compared to a method that is based on the logical sum, the estimation accuracy of the significant sub block information can be improved. In addition, by adding a condition that the significant sub block information of the right-side sub block is "1" and the significant sub block information of the lower-side sub block is "0" and a condition that the significant sub block information of the right-side sub block is "0" and the significant sub block information of the lower-side sub block is "1", the estimation accuracy of the significant sub block information for a large orthogonal transform region having either a vertical component or a horizontal component can be improved.

The significant sub block information decoding controller 1008 determines the value of the significant sub block information (S202). When the significant sub block information is "0", all the differential coefficient values of the processing target sub block stored in the differential coefficient buffer 1002 are set to "0" (S209), and the decoding process of sub block differential coefficient values ends.

When the significant sub block information is "1", the decoding process of all the significant differential coefficient information of the sub block to be processed is performed (S203). The sequence of decoding of the significant differential coefficient information of a sub block will be described later in detail. After the decoding of all the significant differential coefficient information of the sub block is completed, the process proceeds to the decoding of differential coefficient values of step S204.

Subsequently, the decoding process of all the differential coefficient values of the sub block to be processed is performed (S204). The sequence of the decoding of the differential coefficient values of the sub block will be described later in detail. After the decoding of all the differential coefficient values of the sub block is completed, the process proceeds to step S101.

[Sequence of Decoding Process of Significant Differential Coefficient Information (S203)]

The context index processing unit 1010 calculates the neighboring significant index sigCoeffIndex based on the significant sub block information of a decoded block neighboring to the right side of the sub block to be processed and the significant sub block information of a decoded block neighboring to the lower side that are supplied from the significant sub block information buffer 1009. The neighboring significant index sigCoeffIndex is set such that sigCoeffIndex=sigGroupRight+2×sigGroupBottom (S1301).

The significant coefficient information decoding controller 1006 determines differential coefficients that are the processing targets (S1302). The scanning sequence of differential coefficients within the sub block, similarly to the scanning sequence of sub blocks in the differential coefficient region, follows the rule represented in FIG. 7. When the scanning of all the significant differential coefficients of the sub block is completed, the decoding process of the significant differential coefficients is completed, and the process proceeds to the decoding sequence (S204) of differential coefficient values.

The significant coefficient information decoding controller 1006 derives the neighboring significant index sigCoeffIndex from the context index processing unit 1010 and evaluates the derived neighboring significant index sigCoeffIndex (S1303).

In a case where the neighboring significant index sigCoeffIndex is "0", the position of the processing target differential coefficient within the sub block to be processed is determined (S1304). In a case where the neighboring significant index sigCoeffIndex is "0", it represents that both the significant sub block information sigGroupRight and the significant sub block information sigGroupBottom are "0". Here, it is represented such that a horizontal differential coefficient position is posX, a vertical differential coefficient position is posY, and the processing target differential coefficient position is pos=posX+posY. In a case where pos<=2, the context index ctxIdx used for decoding the significant coefficient information is set to "1" (S1305). Otherwise (pos>2), the context index ctxIdx is set to "0" (S1306). The definition of the context index ctxIdx of a case where the neighboring significant index sigCoeffIndex is "0" is denoted by reference numeral 1201 in FIG. 20. After the determined context is read from the context memory 1004, a decoding command is transmitted to the arithmetic decoder 1001 together with the context. The arithmetic decoder 1001 performs a decoding process of a bitstream using the context, thereby decoding the significant differential coefficient information (S1316).

On the other hand, in a case where the neighboring significant index sigCoeffIndex is not "0", it is determined whether the neighboring significant index sigCoeffIndex is "1" (S1307). In a case where the neighboring significant index sigCoeffIndex is "1", it represents that the significant sub block information sigGroupRight is "1" and the significant sub block information sigGroupBottom is "0". In a case where the neighboring significant index sigCoeffIndex is "1", the position of the processing target differential coefficient within the sub block to be processed is determined (S1308). In a case where the vertical differential coefficient position posY<=1, the context index ctxIdx used for decoding the significant coefficient information is set to "1" (S1309). Otherwise (posY>2), the context index ctxIdx is set to "0" (S1310). The definition of the context of a case where the neighboring significant index sigCoeffIndex is "1" is denoted by reference numeral 1202 in FIG. 20. After the determined context is read from the context memory 1004, a decoding command is transmitted to the arithmetic decoder 1001 together with the context. The arithmetic decoder 1001 performs a decoding process of a bitstream using the context, thereby decoding the significant differential coefficient information (S1316).

On the other hand, in a case where the neighboring significant index sigCoeffIndex is not "1", it is determined whether the neighboring significant index sigCoeffIndex is "2" (S1311). In a case where the neighboring significant index sigCoeffIndex is "2", it represents that the significant sub block information sigGroupRight is "0" and the significant sub block information sigGroupBottom is "1". In a case where the neighboring significant index sigCoeffIndex is "2", the position of the processing target differential coefficient within the sub block to be processed is determined (S1312). In a case where the horizontal differential coefficient position posX<=1, the context index ctxIdx used for decoding the significant coefficient information is set to "1" (S1313). Otherwise (posX>2), the context index ctxIdx is set to "0" (S1314). The definition of the context index ctxIdx of a case where the neighboring significant index sigCoeffIndex is "2" is denoted by reference numeral 1203 in FIG. 20. After the determined context is read from the context memory 1004, a decoding command is transmitted to the arithmetic decoder 1001 together with the context. The arithmetic decoder 1001 performs a decoding process of a bitstream using the context, thereby decoding the significant differential coefficient information (S1316).

In addition, in a case where the neighboring significant index sigCoeffIndex is not "2", in other words, in a case where the neighboring significant index sigCoeffIndex is "3", the position of the processing target differential coefficient within the sub block to be processed is determined (S1317). In a case where the neighboring significant index sigCoeffIndex is "3", it represents that both the significant sub block information sigGroupRight and significant sub block information sigGroupBottom are "1". In a case where the processing target differential coefficient position pos<=4, the context index ctxIdx used for decoding the significant coefficient information is set to "2" (S1318). Otherwise (pos>5), the context index ctxIdx is set to "1" (S1314). The definition of the context index ctxIdx of a case where neighboring significant index sigCoeffIndex is "3" is denoted by reference numeral 1204 in FIG. 20. After the determined context is read from the context memory 1004, a decoding command is transmitted to the arithmetic decoder 1001 together with the context. The arithmetic decoder 1001 performs a decoding process of a bitstream using the context, thereby decoding the significant differential coefficient information (S1316).

In this sequence, for the calculation of the context index ctxIdx for the significant differential coefficient information, the significant sub block information of the decoded neighboring sub blocks and the position of the processing target differential coefficient within the sub block are referred to, and the significant sub block information of the right side and the significant sub block information of the lower side are individually determined. Hereinafter, the reason for employing such a configuration will be described.

Generally, the orthogonal transform coefficients of a picture may be easily concentrated in the low region component, and there is a high possibility that the significant coefficient information is "1". In addition, since it is difficult for the high region component of the orthogonal transform coefficient to receive a visual influence, the high region component is quantized in a rough manner in many cases, and accordingly, there is a high possibility that the coefficient value of the high region component is "0", and the significant coefficient information of the high region component is "0". Such a characteristic is not limited to the entire differential coefficient region but is the same for each sub block, and it can be regarded that, for a component present on the low region side of the sub block, a probability that the significant coefficient information is "1" is higher than that for a component present on the high region side of the sub block. Setting the value of the context index ctxIdx of the significant differential coefficient information presented in the low region within the sub block to be larger than the value of the context index ctxIdx of the significant differential coefficient information present in the high region leads to the improvement of the estimation accuracy of the occurrence probability of the significant coefficient information. In addition, the decoded neighboring significant sub block information tends to be small in the high region in which the probability that the significant differential coefficient is "0" is high, and the decoded neighboring significant sub block information tends to increase in the low region in which the probability that the significant differential coefficient is "1" is high. Thus, by using the decoded neighboring significant sub block information as an index representing the degree of inclusion of the significant differential coefficient information in the sub block to be processed improves the estimation accuracy of the occurrence probability of the significant coefficient information.

In the context calculating process of this example, in a case where the right-side significant sub block information sigGroupRight is "1" and the lower-side significant sub block information sigGroupBottom is "0" and in a case where the right-side significant sub block information sigGroupRight is "0" and the lower-side significant sub block information sigGroupBottom is "1", mutually-different context indexes can be set, which is different from the first example. In a case where the right-side significant sub block information sigGroupRight is "1" and the lower-side significant sub block information sigGroupBottom is "0", a significant differential coefficient is not present on the lower side of the sub block to be processed, and accordingly, there is a high possibility that a significant differential coefficient is not present in the high region component of the vertical direction within the sub block to be processed. on the other hand, in a case where the right-side significant sub block information sigGroupRight is "0" and the lower-side significant sub block information sigGroupBottom is "1", a significant differential coefficient is not present on the right side of the sub block to be processed, and accordingly, there is a high possibility that a significant differential coefficient is not present in the high region component of the horizontal direction within the sub block to be processed. Therefore, by employing the configuration of this example in which a context index is appropriately selected in accordance with the occurrence probabilities of significant differential coefficients in the vertical and horizontal directions, the estimation accuracy of the occurrence probabilities of significant differential coefficients can be improved.

In addition, in this example, from the viewpoint of a decrease in the processing amount, while the sub block that is neighboring to the right side of the sub block to be decoded and the sub block that is neighboring to the lower side thereof are referred to as the decoded neighboring sub blocks, the decoded neighboring sub blocks according to the present invention are not limited thereto. Particularly, the sub block that is neighboring to the lower right side of the sub block to be decoded is close to the sub block to be decoded and has a high correlation with the sub block to be decoded. Accordingly, by adding the significant sub block information sigGroupBottomRight of the sub block that is neighboring to the lower right side to the determination target for the calculation of the context index ctxIdx, the accuracy of the occurrence probabilities of significant differential coefficients can be improved. However, compared to the sub blocks neighboring to the right side of the sub block to be decoded and the sub block neighboring to the lower side thereof, the sub block that is neighboring to the lower right side of the sub block to be decoded is positioned far from the sub block to be decoded and has a low correlation with the sub block to be decoded. Accordingly, in the configuration in which the context index of the significant differential coefficient is calculated based on the right-side significant sub block information sigGroupRight, the lower-side significant sub block information sigGroupBottom, and the significant sub block information sigGroup- BottomRight, it is preferable to set the degree of reflection of the significant differential coefficient of the significant sub block information sigGroupBottomRight on the context index to be lower than those of the significant sub block information sigGroupBottom and the significant sub block information sigGroupBottomRight. As a method for setting the degree of reflection of the significant differential coefficient of the significant sub block information sigGroupBottomRight on the context index to be low, for example, in a case where both the lower-side significant sub block information sigGroupBottom and the significant sub block information sigGroupBottomRight are "0", the occurrence probability of the significant differential coefficient is set to be low regardless of the value of the significant sub block information sigGroupBottomRight.

In this example, while the right-side significant sub block information sigGroupRight, the lower-side significant sub block information sigGroupBottom, and the position of the processing target coefficient are referred to, the differential coefficient belonging to the processing target sub block is not targeted for the right-side significant sub block information sigGroupRight and the lower-side significant sub block information sigGroupBottom, and accordingly, there is no dependency within the sub block for the calculation of context indexes. Since the context indexes for all the significant differential coefficients can be calculated from the start of the sub block, the calculation of the context indexes can be performed in parallel with the decoding process of the significant differential coefficient information. Thus, a processing delay relating to the decoding of significant coefficient information having a high occurrence frequency in the bitstream can be decreased.

In this example, in both the calculation of the context index used for decoding the significant sub block information and the calculation of the context index used for decoding the significant differential coefficient information, the significant sub block information of decoded sub blocks that are neighboring to the sub block to be processed is referred to. Accordingly, the context index of the significant sub block information and the context index of the significant differential coefficient information can be calculated through one read operation for a register storing the right-side and lower-side significant sub block information, and the amount of calculation relating to the calculation of the context indexes can be reduced.

The significant sub block information is one-bit information and corresponds to each sub block. Accordingly, the significant sub block information is integer-value information, and, compared to the differential coefficient buffer corresponding to each differential coefficient value, the amount of information thereof is small. In other words, by building a significant sub block information buffer in a memory having a transmission speed higher than the differential coefficient buffer, a device capable of decreasing a delay time relating to the context indexes of differential coefficients can be realized at low cost.

In this example, while a context index used for decoding the significant differential coefficient information is calculated based on the significant sub block information of the decoded sub block, a similar sequence may be applied to the calculation of the context index of the differential coefficient value. Similarly to the significant differential coefficient information, the differential coefficient value has correlation with the neighboring coefficient values and has concentration in the low region component. Thus, by setting a context index representing a high occurrence probability of a large differential coefficient value when the neighboring significant differential coefficient sum or the sum of the absolute values of the neighboring differential coefficients is large and setting a context index representing a low occurrence probability of a small differential coefficient value when the neighboring significant differential coefficient sum or the sum of the absolute values of the neighboring differential coefficients is small, the differential coefficient values can be efficiently coded.

Figure 19:
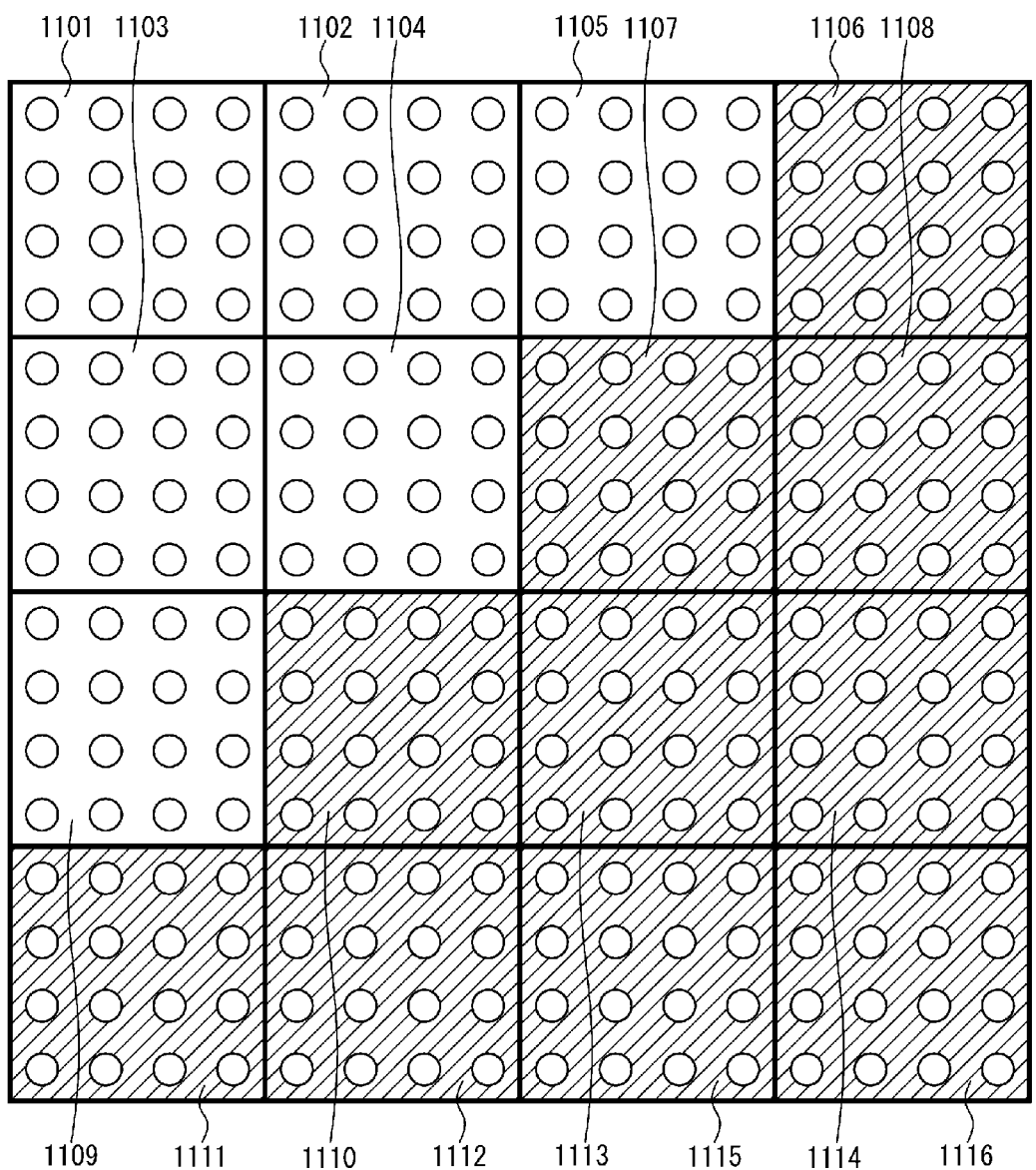
FIG. 19 is a diagram that illustrates the configuration in which a sub block position is included in the calculation of the context of significant differential coefficient information.

By reflecting the position of the sub block on the context calculation, context estimation having higher accuracy can be realized. FIG. 19 illustrates an example in which the differential coefficient region is classified into two areas including a low-region area and a high-region area. In FIG. 19, areas denoted by reference numerals 1101, 1102, 1103, 1104, 1105, and 1109 are low region components, and areas denoted by reference numerals 1106, 1107, 1108, 1110, 1111, 1112, 1113, 1114, 1115, and 1116 are high-region areas. After the context indexes ctxIdx are calculated in the above-described sequence for the high-region areas, predetermined offsets corresponding to the positions of sub blocks may be configured to be added to the context indexes ctxIdx described above for the low-region areas, or a conditional branch according to the position of the sub block may be configured to be added during the calculation of the context indexes ctxIdx described above. In addition, after the context indexes ctxIdx are calculated in the above-described sequence for the low-region areas, for the high-region area, generally, there is a high possibility that the significant differential coefficient is "0", and the number of the neighboring significant differential coefficients may easily include an error in the probability estimation, and accordingly, a configuration in which the context ctxIdx=0 is constantly set may be employed.

Furthermore, by adding the prediction mode used at the time of calculating the differential coefficients to the condition determination performed during the sequence of calculating the context indexes of the significant differential coefficients, the accuracy of the context estimation can be improved. The reason for this is that, generally, compared to an intra prediction in which only a decoded area of a decoding target picture is set as a reference target, an inter prediction capable of referring to a plurality of decoded pictures has characteristics that the prediction accuracy is high and a differential cannot easily occur.

[Decoding Process of Differential Coefficient Value (S204)]

The significant coefficient information decoding controller 1006 determines differential coefficients that are the processing targets (S501). The scanning sequence of differential coefficients within the sub block, similarly to the scanning sequence of the significant differential coefficients, follows the rule represented in FIG. 7. When the scanning of all the differential coefficients of the sub block is completed, the decoding process of the differential coefficients is completed, and the process proceeds to the sequence (S101) of determining the next sub block.

The significant coefficient information decoding controller 1006 determines whether or not the differential coefficient value of the processing target differential coefficient position is "0" (S502). In a case where the differential coefficient value of the processing target differential coefficient position is "0", the decoding of the differential coefficient value of the processing target differential coefficient position is completed, and the process proceeds to step S501.

In a case where the differential coefficient value of the processing target differential coefficient position is "1", the absolute value of the differential coefficient of the processing target differential coefficient position is decoded (S503). In a case where this sequence is performed, it is determined that the differential coefficient value is not "0", and, as a bitstream, a code word corresponding to a value derived by decreasing one from the absolute value of the differential coefficient is decoded. Accordingly, as the absolute value of the differential coefficient, a value derived by adding "1" to a value that is derived by performing entropy decoding of a code word is set.

Subsequently, the sign of the differential coefficient of the processing target differential coefficient position is decoded (S504). A differential coefficient value is determined based on the absolute value of the differential coefficient and the sign of the differential coefficient.

In this example, while a context index used for decoding the significant differential coefficient information is calculated based on the significant differential coefficient information of the decoded sub block, a similar sequence may be applied to the calculation of the context index of the differential coefficient value. Similarly to the significant differential coefficient information, the differential coefficient value has correlation with the neighboring coefficient values and has concentration in the low region component. Thus, by setting a context index representing a high occurrence probability of a large differential coefficient value when the neighboring significant differential coefficient sum or the sum of the absolute values of the neighboring differential coefficients is large and setting a context index representing a high occurrence probability of a small differential coefficient value when the neighboring significant differential coefficient sum or the sum of the absolute values of the neighboring differential coefficients is small, the differential coefficient values can be efficiently coded.

A coding device and a decoding device according to this example, for example, are realized in the following forms.

A picture coding device that partitions differential coefficients that are transform coefficients of a differential signal between a coding target picture and a predicted picture into a plurality of partial regions and codes the differential coefficients in units of the partial regions, the picture coding device including:

a significant sub block information encoder that codes significant sub block information representing that significant differential coefficient information representing that the differential coefficient value within the partial region of the coding target is not zero but is significant is present;

a significant differential coefficient information encoder that codes the significant differential coefficient information for each differential coefficient within the partial region of the coding target; and a differential coefficient value encoder that codes the differential coefficient value in a case where the significant differential coefficient information is significant for each coefficient within the partial region of the coding target, wherein the significant sub block information encoder and the significant differential coefficient information encoder altogether determine a context used for coding the significant sub block information within the partial region of the coding target and the significant differential coefficient information based on the significant sub block information of a coded partial region that is neighboring to the partial region of the coding target in the horizontal direction and the significant sub block information of a coded partial region that is neighboring to the partial region of the coding target in the vertical direction.

A picture coding device that partitions differential coefficients that are transform coefficients of a differential signal between a coding target picture and a predicted picture into a plurality of partial regions and codes the differential coefficients in units of the partial regions, the picture coding device including:

a significant sub block information encoder that codes significant sub block information representing that significant differential coefficient information representing that the differential coefficient value within the partial region of the coding target is not zero but is significant is present;

a significant differential coefficient information encoder that codes the significant differential coefficient information for each differential coefficient within the partial region of the coding target; and a differential coefficient value encoder that codes the differential coefficient value in a case where the significant differential coefficient information is significant for each coefficient within the partial region of the coding target, wherein the significant sub block information encoder and the significant differential coefficient information encoder altogether determine a context used for coding the significant sub block information within the partial region of the coding target and the significant differential coefficient information based on the significant sub block information of a coded partial region that is neighboring to the partial region of the coding target in the horizontal direction and the significant sub block information of a coded partial region that is neighboring to the partial region of the coding target in the vertical direction, and wherein the significant differential coefficient information encoder, in a case where information representing the significance of the differential coefficient of a coded partial region neighboring to the partial region of the coding target in the horizontal direction represents that the significance of the differential coefficient within the coded partial region is high, determines a context index used for coding the significant differential coefficient information within the partial region of the coding target such that the significance of the significant differential coefficient information of a vertical low-region component of the partial region of the coding target is raised and, in a case where information representing the significance of the differential coefficient of a coded partial region neighboring to the partial region of the coding target in the vertical direction represents that the significance of the differential coefficient within the coded partial region is high, determines a context index used for coding the significant differential coefficient information within the partial region of the coding target such that the significance of the significant differential coefficient information of a horizontal low-region component of the partial region of the coding target is raised.

A picture decoding device that partitions differential coefficients that are transform coefficients of a differential signal between a decoding target picture and a predicted picture into a plurality of partial regions and decodes the differential coefficients in units of the partial regions, the picture decoding device including:

a significant sub block information decoder that decodes significant sub block information representing that significant differential coefficient information representing that the differential coefficient value within the partial region of the decoding target is not zero but is significant is present;

a significant differential coefficient information decoder that decodes the significant differential coefficient information for each differential coefficient within the partial region of the decoding target; and a differential coefficient value decoder that decodes the differential coefficient value in a case where the significant differential coefficient information is significant for each coefficient within the partial region of the decoding target, wherein the significant sub block information decoder and the significant differential coefficient information decoder altogether determine a context used for decoding the significant sub block information within the partial region of the decoding target and the significant differential coefficient information based on the significant sub block information of a decoded partial region that is neighboring to the partial region of the decoding target in the horizontal direction and the significant sub block information of a decoded partial region that is neighboring to the partial region of the decoding target in the vertical direction.

A picture decoding device that partitions differential coefficients that are transform coefficients of a differential signal between a decoding target picture and a predicted picture into a plurality of partial regions and decodes the differential coefficients in units of the partial regions, the picture decoding device including:

a significant sub block information decoder that decodes significant sub block information representing that significant differential coefficient information representing that the differential coefficient value within the partial region of the decoding target is not zero but is significant is present;

a significant differential coefficient information decoder that decodes the significant differential coefficient information for each differential coefficient within the partial region of the decoding target; and a differential coefficient value decoder that decodes the differential coefficient value in a case where the significant differential coefficient information is significant for each coefficient within the partial region of the decoding target, wherein the significant sub block information decoder and the significant differential coefficient information decoder altogether determine a context used for decoding the significant sub block information within the partial region of the decoding target and the significant differential coefficient information based on the significant sub block information of a decoded partial region that is neighboring to the partial region of the decoding target in the horizontal direction and the significant sub block information of a decoded partial region that is neighboring to the partial region of the decoding target in the vertical direction, and wherein the significant differential coefficient information decoder, in a case where information representing the significance of the differential coefficient of a decoded partial region neighboring to the partial region of the decoding target in the horizontal direction represents that the significance of the differential coefficient within the decoded partial region is high, determines a context index used for decoding the significant differential coefficient information within the partial region of the decoding target such that the significance of the significant differential coefficient information of a vertical low-region component of the partial region of the decoding target is raised and, in a case where information representing the significance of the differential coefficient of a decoded partial region neighboring to the partial region of the decoding target in the vertical direction represents that the significance of the differential coefficient within the decoded partial region is high, determines a context index used for decoding the significant differential coefficient information within the partial region of the decoding target such that the significance of the significant differential coefficient information of a horizontal low-region component of the partial region of the decoding target is raised.

The picture coding device and the picture decoding device according to the first example described above have the following operations and advantages.

(1) The significant sub block information and the context index of the significant coefficient information are calculated based on the significant sub block information of the right side and the significant sub block information of the lower side. When the significant sub block information of the right side and the lower side of the sub block to be processed is 0, the occurrence probabilities of the significant sub block information and the significant differential coefficient are estimated to be low, and otherwise, the occurrence probabilities of the significant sub block information and the significant differential coefficient are estimated to be high, whereby an appropriate probability model of the significant sub block information and the significant differential coefficient information can be set. Accordingly, the significant sub block information and the significant differential coefficient information can be efficiently coded.

(2) The context index is calculated based on the position of the processing target differential coefficient within the sub block. A context is set, which estimates the differential coefficient disposed in the low region within the sub block to have an occurrence probability of the significant differential coefficient of "1" to be higher than the differential coefficient disposed in the high region within the sub block. Thus, a probability model that is based on the characteristics of the significant differential coefficient information on the frequency domain can be set, and the significant differential coefficient information can be efficiently coded.

(3) The calculation of the neighboring significant differential coefficient sum and the position of the processing target differential coefficient within the sub block do not depend on a decoding result of the significant differential coefficient information within the sub block. Accordingly, a configuration can be employed in which the calculation of the context index within the sub block and the decoding of the significant differential coefficient information are processed in a parallel manner, and therefore, a processing delay relating to the decoding process of the significant differential coefficient information can be reduced. Accordingly, the differential coefficients decrease a processing delay of the significant differential coefficient information having a high occupancy rate in the bitstream and having a large number of processes, and therefore, a decoding device that is appropriate for real-time processing can be realized. In addition, also in the coding device, a processing delay of the coding of the significant differential coefficient information can be similarly decreased.

(4) The significant differential coefficient sum relating to the calculation of the context index of the significant differential coefficient information does not depend on the position of the processing target differential coefficient, and accordingly, the significant differential coefficient sum may be calculated once for the sub block. Accordingly, compared to a configuration in which each neighboring significant differential coefficient sum is calculated in accordance with the position of the processing target differential coefficient, the amount of calculation relating to the calculation of the context indexes can be decreased.

(5) In both the calculation of the context index of the significant differential coefficient information and the calculation of the context index of the significant sub block information, by using the significant sub block information of decoded sub blocks that are neighboring to the sub block to be processed, the configuration for calculating appropriate context indexes of the significant sub block information and the significant differential coefficient information can be realized at low cost.

Second Example

Coding Sequence

A second example of the method of coding the differential information according to an embodiment of the present invention will now be described. FIG. 14 is a block diagram that illustrates the detailed configuration of the differential information encoder 507, which is illustrated in FIG. 5, according to the second example. The differential information encoder 507 according to the second example includes: an arithmetic encoder 701; a differential coefficient buffer 702; a coding controller 703; a context memory 704; and a scan controller 705. In addition, the coding controller 703 includes: a significant coefficient information coding controller 706; a differential coefficient value coding controller 707; a significant sub block information coding controller 708; a significant sub block information buffer 709; a significant sub block information calculator 710; and a context index processing unit 711.

Figure 17:
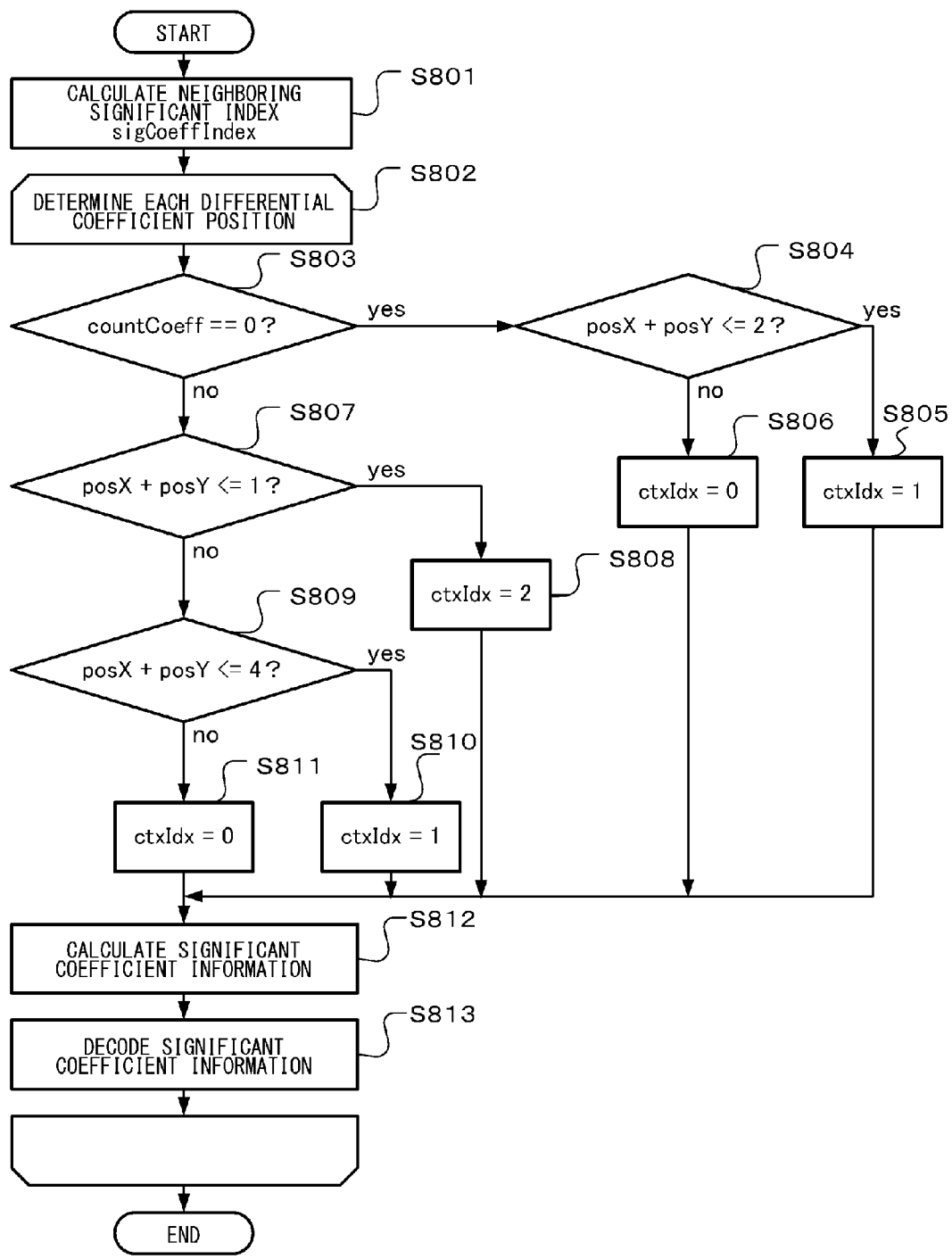
FIG. 17 is a flowchart that illustrates the coding sequence of significant differential coefficient information according to the first example.
Figure 18:
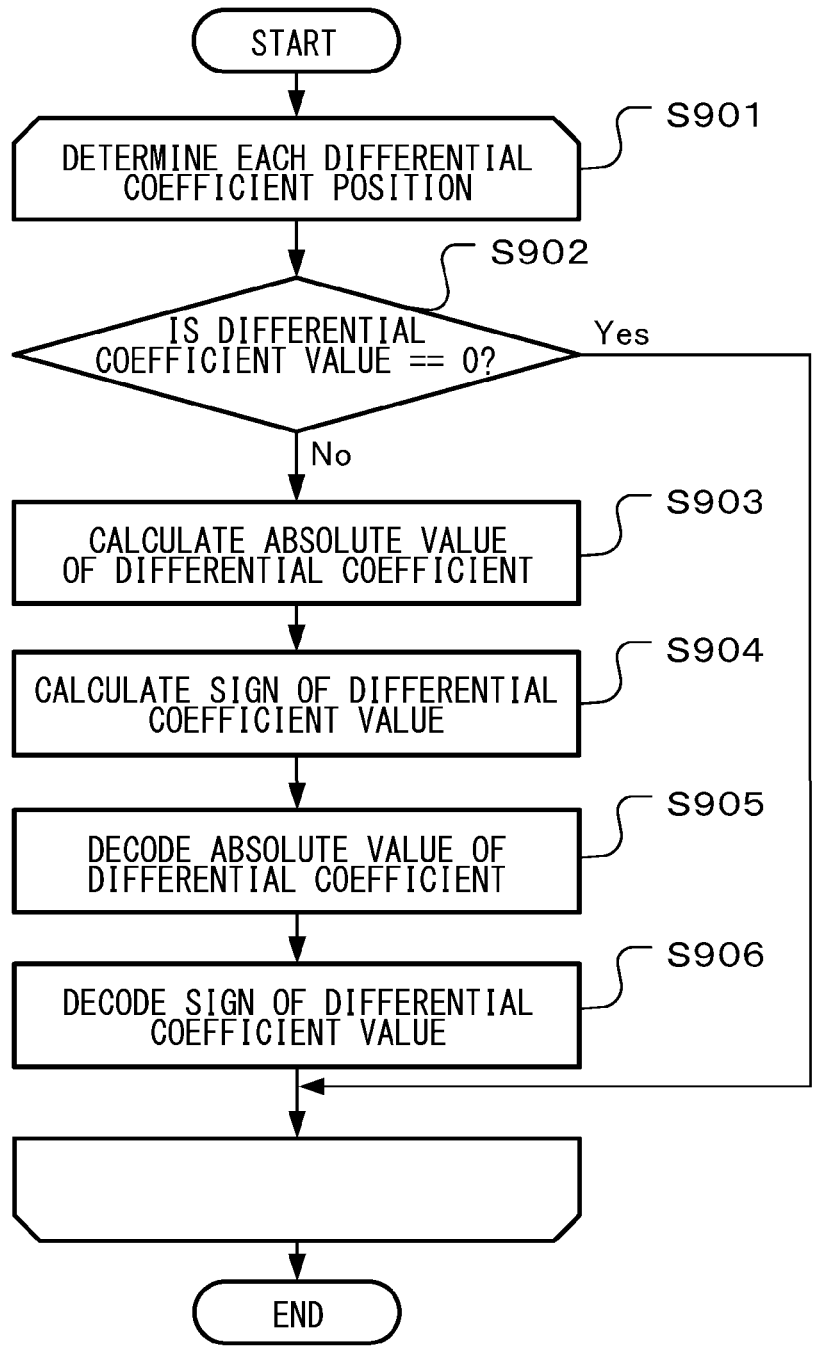
FIG. 18 is a flowchart that illustrates the coding sequence of differential coefficient values according to the first example.

The coding sequence of the differential information according to this example is the same as that of the first example except for the sequence (S704 illustrated in FIG. 16) of the coding process of the significant differential coefficient information, and thus, hereinafter, the sequence of the coding process of the significant differential coefficient information according to this example will be described with reference to a flowchart illustrated in FIG. 17.

[Sequence of Coding Process of Significant Differential Coefficient Information (S704)]

The context index processing unit 711 calculates a neighboring significant index sigCoeffIndex based on the significant sub block information of the decoded sub blocks neighboring to the right side and the lower side of the sub block to be processed. In this sequence, the neighboring significant index sigCoeffIndex is determined as a logical sum of the significant sub block information sigGroupRight and sigGroupBottom (S801). In this sequence, the calculation sequence of the neighboring significant index sigCoeffIndex is the same as the calculation sequence of the context index ctxIdx used for decoding the significant sub block information in step S702. Accordingly, the processes for calculating these can be configured to be common, and thus, compared to the configuration according to the first example, the circuit scale and the amount of calculation can be reduced.

The significant coefficient information coding controller 706 determines differential coefficients that are the processing targets (S802). The scanning sequence of differential coefficients within the sub block, similarly to the scanning sequence of sub blocks in the differential coefficient region, follows the rule represented in FIG. 7. When the scanning of all the significant differential coefficients of the sub block is completed, the coding process of the significant differential coefficients is completed, and the process proceeds to the coding sequence (S704) of differential coefficient values.

The significant coefficient information coding controller 706 derives the neighboring significant index sigCoeffIndex from the context index processing unit 711 and evaluates the derived neighboring significant index sigCoeffIndex (S803).

In a case where the neighboring significant index sigCoeffIndex is "0", the position of the processing target differential coefficient within the sub block to be processed is determined (S804). In a case where the neighboring significant index sigCoeffIndex is "0", it represents that the significant sub block information sigGroupRight is "0" and the significant sub block information sigGroupBottom is "0". Here, it is represented such that a horizontal differential coefficient position is posX, a vertical differential coefficient position is posY, and the processing target differential coefficient position is pos=posX+posY. In a case where pos<=2, the context index ctxIdx used for coding the significant coefficient information is set to "1" (S805). Otherwise (pos>2), the context index ctxIdx is set to "0" (S806). The definition of the context index ctxIdx of a case where the neighboring significant index sigCoeffIndex is "0" is denoted by reference numeral 601 in FIG. 10.

On the other hand, in a case where the neighboring significant index sigCoeffIndex is not "0", in other words, in a case where the neighboring significant index sigCoeffIndex is "1", the position of the processing target differential coefficient within the sub block to be process is determined (S807, S809). In a case where the neighboring significant index sigCoeffIndex is "0", it represents that at least one of the significant sub block information sigGroupRight and the significant sub block information sigGroupBottom is "1". In a case where pos<=1, the context index ctxIdx used for decoding the significant coefficient information is set to "2" (S808), and, in a case where pos<=4, the context index ctxIdx is set to "1" (S810), and otherwise (pos>5), the context index ctxIdx is set to "0" (S811). The definition of the context index ctxIdx of a case where the neighboring significant index sigCoeffIndex is "1" is denoted by reference numeral 602 in FIG. 10.

The significant coefficient information coding controller 706 derives the differential coefficient of the processing target position from the differential coefficient buffer 702. In a case where the differential coefficient value is not "0", the significant differential coefficient information is set to "1". Otherwise (in a case where the differential coefficient value is "0"), the significant differential coefficient information is set to "0" (S812).

After a context corresponding to the determined context index ctxIdx is read from the context memory 704, the significant coefficient information coding controller 706 transmits the significant differential coefficient information and the context to the arithmetic encoder 701. The arithmetic encoder 701 codes the significant differential coefficient information using the context (S813).

[Decoding Sequence]

A method of decoding differential coefficients according to a first example of the embodiment of the present invention will be described. FIG. 8 is a block diagram that illustrates the detailed configuration of the differential information decoder 801, which is illustrated in FIG. 6, according to the first example. The differential information decoder 801 according to the first example includes: an arithmetic decoder 1001; a differential coefficient buffer 1002; a decoding controller 1003; a context memory 1004; and a scan controller 1005. In addition, the decoding controller 1003 includes: a significant coefficient information decoding controller 1006; a differential coefficient value decoding controller 1007; a significant sub block information decoding controller 1008; a significant sub block information buffer 1009; and a context index processing unit 1010.

Since the differential information decoding process performed by the differential information decoder 801 illustrated in FIG. 8 corresponds to the differential information coding process performed by the differential information encoder 507 illustrated in FIG. 5, the configurations of the differential coefficient buffer 1002, the context memory 1004, the scan controller 1005, the significant sub block information buffer 1009, and the context index processing unit 1010 of the differential information encoder illustrated in FIG. 8 respectively have functions corresponding to the configurations of the differential coefficient buffer 702, the context memory 704, the scan controller 705, the significant sub block information buffer 709, and the context index processing unit 711 illustrated in FIG. 14.

Figure 4:
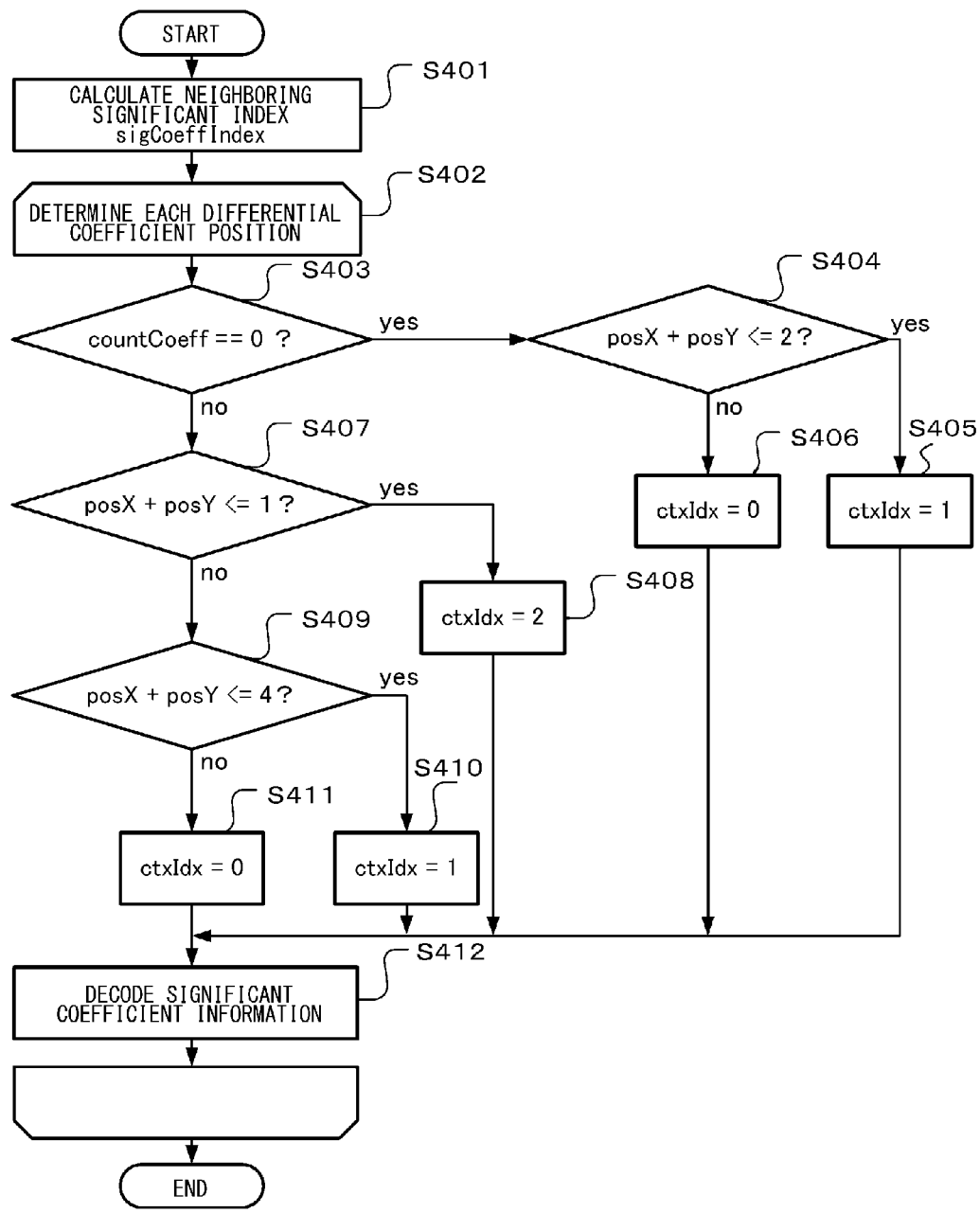
FIG. 4 is a flowchart that illustrates a decoding sequence of significant differential coefficients according to a second example.

The coding sequence of the differential information according to this example is the same as that of the first example except for the sequence (S203 illustrated in FIG. 2) of the coding process of the significant differential coefficient information. Thus, hereinafter, the sequence of the coding process of the significant differential coefficient information according to this example will be described with reference to the flowchart illustrated in FIG. 4.

The scan controller 1005 determines a sub block to be processed (S101). When the scanning of all the sub blocks is completed, the decoding process of differential coefficients ends. Reference numeral 902 represented in FIG. 7 illustrates the scanning sequence of sub blocks. In this sequence, scanning is started from a sub block disposed on the lower rightmost side of the differential coefficient region, scanning according to a rule of the lower right side to the upper left side and the upper right side to the upper left side is performed, and the scanning is completed at a sub block disposed on the upper leftmost side. Reference numeral 901 represented in FIG. 7 illustrates the scanning sequence of sub blocks using arrows. In a case where the scanning sequence illustrated in FIG. 7 is applied, the scanning of sub blocks spatially positioned respectively on the right side and the lower side of the sub block to be processed is in the completed state. The decoding process of the sub block to be processed is performed (S102).

[Sequence of Decoding Process of Significant Differential Coefficient Information (S203)]

The context index processing unit 1010 calculates a neighboring significant index sigCoeffIndex based on the significant sub block information of the decoded sub blocks neighboring to the right side and the lower side of the sub block to be processed. In this sequence, the neighboring significant index sigCoeffIndex is determined as a logical sum of the significant sub block information sigGroupRight and sigGroupBottom (S401). In this sequence, the calculation sequence of the neighboring significant index sigCoeffIndex is the same as the calculation sequence of the context index ctxIdx used for decoding the significant sub block information in step S702. Accordingly, the processes for calculating these can be configured to be common, and thus, compared to the configuration according to the first example, the circuit scale and the amount of calculation can be reduced.

The significant coefficient information decoding controller 1006 determines differential coefficients that are the processing targets (S402). The scanning sequence of differential coefficients within the sub block, similarly to the scanning sequence of sub blocks in the differential coefficient region, follows the rule represented in FIG. 7. When all the significant differential coefficients of the sub block are completed, the decoding process of the significant differential coefficients is completed, and the process proceeds to the decoding sequence (S204) of differential coefficient values.

The significant coefficient information decoding controller 1006 derives the neighboring significant index sigCoeffIndex from the context index processing unit 1010 and evaluates the derived neighboring significant index sigCoeffIndex (S403).

In a case where the neighboring significant index sigCoeffIndex is "0", the position of the processing target differential coefficient within the sub block to be processed is determined (S404). In a case where the neighboring significant index sigCoeffIndex is "0", it represents that both the significant sub block information sigGroupRight and the significant sub block information sigGroupBottom are "0". Here, it is represented such that a horizontal differential coefficient position is posX, a vertical differential coefficient position is posY, and the processing target differential coefficient position is pos=posX+posY. In a case where pos<=2, the context index ctxIdx used for decoding the significant coefficient information is set to "1" (S405). Otherwise (pos>2), the context index ctxIdx is set to "0" (S406). The definition of the context index ctxIdx of a case where the neighboring significant index sigCoeffIndex is "0" is denoted by reference numeral 601 in FIG. 10. After the determined context is read from the context memory 1004, a decoding command is transmitted to the arithmetic decoder 1001 together with the context. The arithmetic decoder 1001 performs a decoding process of a bitstream using the context, thereby decoding the significant differential coefficient information (S410).

On the other hand, in a case where the neighboring significant index sigCoeffIndex is not "0", in other words, in a case where the neighboring significant index sigCoeffIndex is "1", the position of the processing target differential coefficient within the sub block to be processed is determined (S407, S409). In a case where the neighboring significant index sigCoeffIndex is "1", it represents that at least one of the significant sub block information sigGroupRight and the significant sub block information sigGroupBottom is "1". In a case where pos<=1, the context index ctxIdx used for decoding the significant coefficient information is set to "2" (S408), and, in a case where pos<=4, the context index ctxIdx used for decoding the significant coefficient information is set to "1" (S410), and otherwise (pos>5), the context index ctxIdx is set to "1" (S411). The definition of the context index ctxIdx of a case where the neighboring significant index sigCoeffIndex is "1" is denoted by reference numeral 602 in FIG. 10. After the determined context is read from the context memory 1004, a decoding command is transmitted to the arithmetic decoder 1001 together with the context. The arithmetic decoder 1001 performs a decoding process of a bitstream using the context, thereby decoding the significant differential coefficient information (S412).

In this sequence, in the calculation of the neighboring significant index sigCoeffIndex during the calculation sequence of the context index ctxIdx for the significant differential coefficient information, calculation that is common to that of the calculation sequence of the context index for the significant sub block information is performed. By configuring the sequence of the calculation of the context index of the differential coefficient information to be common, the circuit scale can be reduced.

In this example, while the context index of the significant differential coefficient information and the neighboring significant index sigCoeffIndex are individually calculated, by including a unit for storing the context index of the significant differential coefficient information, instead of calculating the neighboring significant index sigCoeffIndex, the context index of the significant differential coefficient information, which is calculated in advance, may be configured to be referred to. In such a case, the amount of calculation can be reduced.

In this example, both the neighboring significant index sigCoeffIndex and the context index of the significant differential coefficient information are set as a logical sum of sigCoeffRight and sigCoeffBottom, instead of the logical sum, for example, a sum of sigCoeffRight and sigCoeffBottom may be configured to be set as the neighboring significant index sigCoeffIndex. By employing such a configuration, for the significant differential information and the significant sub block information of a case where only one of sigCoeffRight and sigCoeffBottom is "1" or a case where when both sigCoeffRight and sigCoeffBottom are "1", an appropriate probability model can be set, and accordingly, compared to the configuration using the logical sum, improved coding efficiency can be derived. Furthermore, instead of the logical sum, the calculation equation for the neighboring significant index sigCoeffIndex according to the first example may be applied. In such a case, in addition to the configuration using the sum described above, in a case where only sigCoeffRight is "1" and in a case where only sigCoeffBottom is "1", probability models that are appropriate thereto can be set, and therefore, compared to the configuration using the sum described above, improved coding efficiency can be derived.

A coding device and a decoding device according to this example, for example, are realized in the following forms.

A picture coding device that partitions differential coefficients that are transform coefficients of a differential signal between a coding target picture and a predicted picture into a plurality of partial regions and codes the differential coefficients in units of the partial regions, the picture coding device including:

a significant sub block information encoder that codes significant sub block information representing that significant differential coefficient information representing that the differential coefficient value within the partial region of the coding target is not zero but is significant is present;

a context index processing unit that calculates a neighboring significant index used for determining a context index used for decoding the significant sub block information and a context index used for decoding the significant differential coefficient information;

a significant differential coefficient information encoder that codes the significant differential coefficient information for each differential coefficient within the partial region of the coding target; and a differential coefficient value encoder that codes the differential coefficient value in a case where the significant differential coefficient information is significant for each coefficient within the partial region of the coding target, wherein the context index processing unit determines a context index used for decoding the significant sub block information within the partial region of the coding target and the neighboring significant index used for coding the significant differential coefficient information through same calculation that is based on a logical sum or a sum of the significant sub block information of a coded partial region that is neighboring to the partial region of the coding target in the horizontal direction and the significant sub block information of a coded partial region that is neighboring to the partial region of the coding target in the vertical direction.

A picture decoding device that partitions differential coefficients that are transform coefficients of a differential signal between a decoding target picture and a predicted picture into a plurality of partial regions and decodes the differential coefficients in units of the partial regions, the picture decoding device including:

a significant sub block information decoder that decodes significant sub block information representing that significant differential coefficient information representing that the differential coefficient value within the partial region of the decoding target is not zero but is significant is present;

a context index processing unit that calculates a neighboring significant index used for determining a context index used for decoding the significant sub block information and a context index used for decoding the significant differential coefficient information;

a significant differential coefficient information decoder that decodes the significant differential coefficient information for each differential coefficient within the partial region of the decoding target; and a differential coefficient value decoder that decodes the differential coefficient value in a case where the significant differential coefficient information is significant for each coefficient within the partial region of the decoding target, wherein the context index processing unit determines a context index used for decoding the significant sub block information within the partial region of the decoding target and the neighboring significant index used for decoding the significant differential coefficient information through same calculation that is based on a logical sum or a sum of the significant sub block information of a decoded partial region that is neighboring to the partial region of the decoding target in the horizontal direction and the significant sub block information of a decoded partial region that is neighboring to the partial region of the decoding target in the vertical direction.

The picture coding device and the picture decoding device according to the second example described above have the following operations and advantages in addition to the operations and advantages (1) to (5) according to the first example described above.

(6) In the calculation sequence of the context index of the significant sub block information and the calculation sequence of the context index of the significant differential coefficient information, by using common calculation, the amount of calculation relating to the calculation of the context index of the differential coefficient information is reduced, whereby the circuit scale can be reduced.

A bitstream of a picture that is output by the picture coding device according to the embodiment described above has a specific data format so as to be decodable in accordance with a coding method used in the embodiment, and the picture decoding device corresponding to the picture coding device can decode the bitstream of the specific data format.

In a case where a wired or wireless network is used for exchanging a bitstream between the picture coding device and the picture decoding device, the bitstream may be converted into a data format that is appropriate for the transmission form in a communication path and be transmitted. In such a case, a picture transmission device is disposed, which converts a bitstream output by the picture coding device into coding data of a data format that is appropriate to the transmission form in the communication path and transmits the converted coding data to the network, and a picture reception device is disposed, which receives the coding data from the network, restores the bitstream from the coding data, and supplies the restored bitstream to the picture decoding device.

The picture transmission device includes: a memory that buffers a bitstream output by the picture coding device; a packet processing unit that packetizes the bitstream; and a transmitter that transmits packetized coding data through a network. The picture reception device includes: a reception unit that receives packetized coding data through a network; a memory that buffers the received coding data; and a packet processing unit that constructs a bitstream by performing a packet process of coding data and supplies the constructed bitstream to the picture decoding device.

The processes relating to the coding and decoding described above may be realized not only by a transmission/storage/reception device using hardware but also by firmware stored in a read only memory (ROM), a flash memory, or the like or software of a computer or the like. The firmware or the software program may be provided with being recorded in a recording medium that can be read by a computer or the like, may be provided from a server through a wired or wireless network, or may be provided by data broadcasting of terrestrial wave or satellite digital broadcasting.

As above, the present invention has been described based on the embodiments. However, such embodiments are merely examples, and it is understood to a person skilled in the art that various modifications may be made in each constituent element thereof or a combination of each process sequence, and such modified examples also belong to the scope of the present invention.

What is claimed is:

1. A picture decoding device that decodes a bitstream in which differential information between a picture that is a decoding target and a picture that is a prediction target is partitioned into a plurality of sub blocks, and the partitioned sub blocks are coded in a predetermined sequence, the picture decoding device comprising:
    a context deriver that derives a context used for decoding differential coefficients in a decoding sub block that is a decoding target using significant sub block information of a decoded sub block that is neighboring the decoding sub block in a horizontal direction and the significant sub block information of a decoded sub block that is neighboring the decoding sub block in a vertical direction;
    a significant sub block information decoder that decodes the significant sub block information that represents whether or not all values of differential coefficients belonging to a sub block are zero using the context derived by the context deriver;
    a significant differential coefficient information decoder that decodes significant differential coefficient information that represents whether or not a value of the differential coefficients is zero using the context derived by the context deriver; and
    a differential coefficient value decoder that decodes the value of the differential coefficients.

2. A picture decoding method decoding a bitstream in which differential information between a picture that is a decoding target and a picture that is a prediction target is partitioned into a plurality of sub blocks, and the partitioned sub blocks are coded in a predetermined sequence, the picture decoding method comprising:
    deriving a context used for decoding differential coefficients in a decoding sub block that is a decoding target using significant sub block information of a decoded sub block that is neighboring the decoding sub block in a horizontal direction and the significant sub block information of a decoded sub block that is neighboring the decoding sub block in a vertical direction;
    decoding the significant sub block information that represents whether or not all values of differential coefficients belonging to a sub block are zero using the derived context;
    decoding significant differential coefficient information that represents whether or not a value of the differential coefficients is zero using the derived context; and
    decoding the value of the differential coefficients.

3. A non-transitory computer-readable recording medium having embodied thereon a picture decoding program decoding a bitstream in which differential information between a picture that is a decoding target and a picture that is a prediction target is partitioned into a plurality of sub blocks, and the partitioned sub blocks are coded in a predetermined sequence, the picture decoding program causing a computer to perform:
    deriving a context used for decoding differential coefficients in a decoding sub block that is a decoding target using significant sub block information of a decoded sub block that is neighboring the decoding sub block in a horizontal direction and the significant sub block information of a decoded sub block that is neighboring the decoding sub block in a vertical direction;
    decoding the significant sub block information that represents whether or not all values of differential coefficients belonging to a sub block are zero using the derived context;
    decoding significant differential coefficient information that represents whether or not a value of the differential coefficients is zero using the derived context; and
    decoding the value of the differential coefficients.

* * * * *